United States Patent
Nolin et al.

(10) Patent No.: US 11,214,259 B2
(45) Date of Patent: Jan. 4, 2022

(54) METHOD FOR MANAGING WHEEL SLIP IN A VEHICLE

(71) Applicant: BOMBARDIER RECREATIONAL PRODUCTS INC., Valcourt (CA)

(72) Inventors: Christian Nolin, St-Denis-De-Brompton (CA); Antoine Bezeau-Tremblay, Sherbrooke (CA)

(73) Assignee: BOMBARDIER RECREATIONAL PRODUCTS INC., Valcourt (CA)

(*) Notice: Subject to any disclaimer, the term of this patent is extended or adjusted under 35 U.S.C. 154(b) by 382 days.

(21) Appl. No.: 16/143,010

(22) Filed: Sep. 26, 2018

(65) Prior Publication Data

US 2020/0094840 A1 Mar. 26, 2020

(51) Int. Cl.
*B60W 30/18* (2012.01)
*F02M 37/00* (2006.01)
(Continued)

(52) U.S. Cl.
CPC ....... *B60W 30/18172* (2013.01); *B60K 17/34* (2013.01); *B60W 2520/10* (2013.01);
(Continued)

(58) Field of Classification Search
CPC ....... B60W 30/18172; B60W 2520/10; B60W 2520/28; B60W 2710/0605;
(Continued)

(56) References Cited

U.S. PATENT DOCUMENTS 8,321,115 B2 * 11/2012 Oral ............... B60W 30/18172
701/85
9,002,562 B2 * 4/2015 Andou ................... B60K 6/52
701/22

(Continued)

FOREIGN PATENT DOCUMENTS

DE 102010031140 A1 1/2012
EP 2868958 A1 5/2015
JP 2014148308 A 8/2014

OTHER PUBLICATIONS

Machine translation of JP2014148308A; retrieved from http://translationportal.epo.org/ on Nov. 20, 2018.

(Continued)

*Primary Examiner* — Thomas G Black
*Assistant Examiner* — Matthias S Weisfeld
(74) *Attorney, Agent, or Firm* — BCF LLP

(57) ABSTRACT

A method of managing wheel slip in a vehicle. The vehicle has a frame, an internal combustion engine, front and rear wheels operatively connected to the engine, a throttle valve for controlling a supply of air to the engine, a steering assembly operatively connected to at least the front wheels for steering the vehicle, and an unassisted continuously variable transmission (CVT) operatively connecting the front wheels and the rear wheels to the engine. The method includes: determining a sensed deceleration of the vehicle; comparing the sensed deceleration of the vehicle to a threshold deceleration; and increasing a torque output of the engine from a current engine torque output value to an (Continued)

increased engine torque output value when the sensed deceleration of the vehicle is greater than the threshold deceleration. A method for managing wheel slip in accordance with a drive mode of the vehicle is also disclosed.

26 Claims, 11 Drawing Sheets

(51) Int. Cl.
    *B62D 15/02*     (2006.01)
    *B60K 17/34*     (2006.01)

(52) U.S. Cl.
    CPC . *B60W 2520/28* (2013.01); *B60W 2710/0605* (2013.01); *B60W 2710/0666* (2013.01); *B62D 15/021* (2013.01); *F02M 37/007* (2013.01)

(58) Field of Classification Search
    CPC ......... B60W 2710/0666; B60W 30/18; B60W 30/00; B60W 2520/00; B60W 2520/30; B60W 2520/403; B60W 2520/406; B60K 17/34; B62D 15/021; B62D 15/02; F02M 37/007

USPC .......................................................... 701/85
See application file for complete search history.

(56) References Cited

U.S. PATENT DOCUMENTS

| | | |
|---|---|---|
| 10,807,590 B2 * | 10/2020 | Watanabe ........... B60W 10/184 |
| 2002/0088661 A1 | 7/2002 | Gagnon et al. |
| 2005/0228568 A1 | 10/2005 | Hack et al. |
| 2017/0326987 A1 * | 11/2017 | Watanabe .............. B60T 8/175 |
| 2018/0058573 A1 * | 3/2018 | Barath .................... F16H 59/46 |
| 2018/0065639 A1 * | 3/2018 | Barath .................. B60W 10/06 |

OTHER PUBLICATIONS

Machine translation of DE102010031140A1; retrieved from http://translationportal.epo.org/ on Nov. 20, 2018.

\* cited by examiner

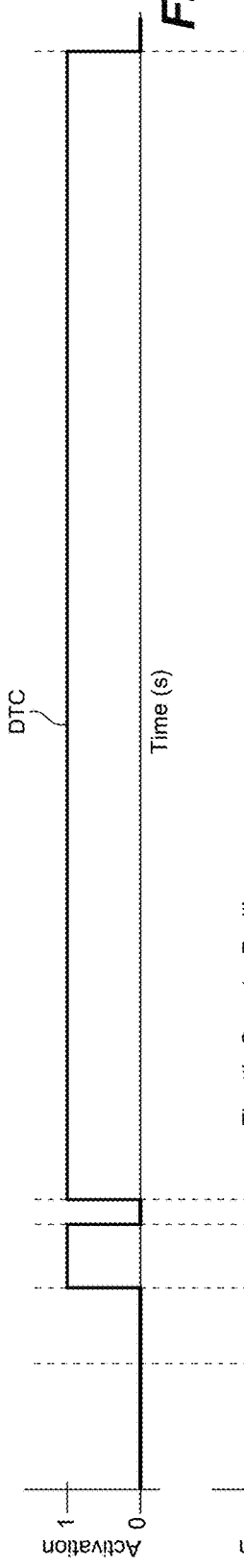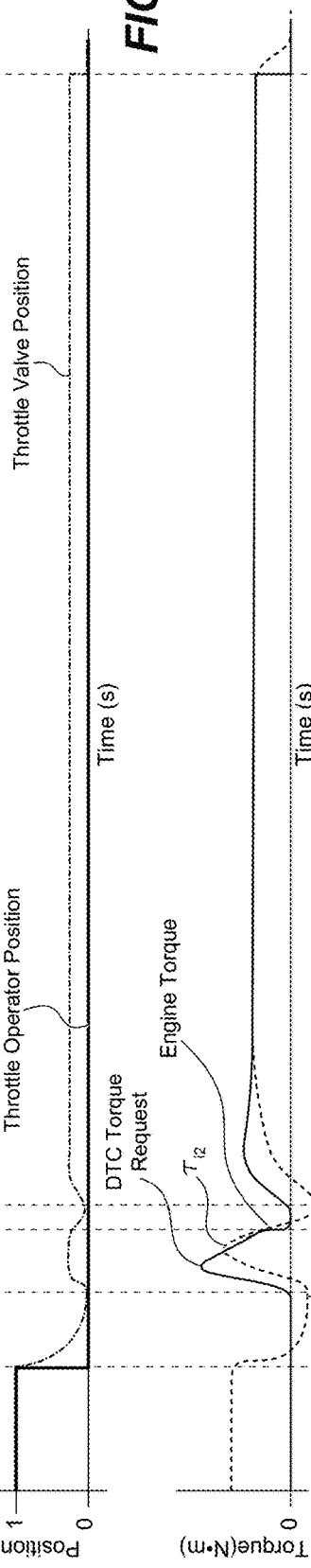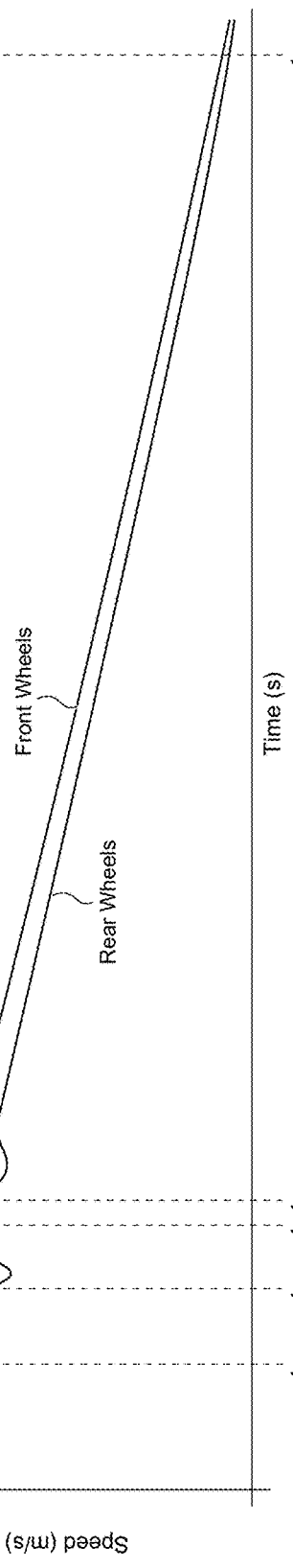

300

| Vehicle Speed (km/h) | Predetermined threshold deceleration (km/h$^2$) |
|---|---|
| 1 | 2 |
| 10 | 4 |
| 20 | 10 |
| ... | ... |
| $S_n$ | $d_n$ |

*FIG. 11*

METHOD FOR MANAGING WHEEL SLIP IN A VEHICLE

TECHNOLOGICAL FIELD

The present technology relates to the management of wheel slip in vehicles, and particularly in off-road vehicles.

BACKGROUND

All-terrain vehicles (ATVs) and similar vehicles are used for utility and recreational purposes. During use, ATVs often travel over slippery surfaces (e.g., ice, snow, mud, gravel, etc.) on which the ATV's wheels have low traction. This low traction can cause wheel slip whereby the force applied by the engine to the ATV's wheels exceeds traction available to the wheels.

Wheel slip can be encountered when the ATV undergoes "engine braking". Engine braking occurs when there is a reduction in throttle input by the driver of the ATV such as, for example, when the driver suddenly lets go of the throttle lever of the ATV. When this happens, a throttle valve in the air intake system of the ATV's engine is closed and air flow through the intake becomes restricted, causing a vacuum to form within the air intake manifold which the engine's pistons work against. Consequently, the torque output of the engine switches from a positive torque output, produced by combusting fuel to drive the wheels, to a negative torque output, produced by the engine working against the vacuum formed in the air intake manifold. When the ATV is on a high friction surface (e.g., dry asphalt) and the ATV undergoes engine braking, the ATV's wheels have sufficient traction to counter the negative torque output of the engine and thus the engine braking causes the ATV to slow down. However, on a slippery surface, the wheels may not have the necessary traction to counter the negative torque output and therefore the wheels can start slipping.

An example of the effect of wheel slip in a prior art ATV in a rear-wheel drive mode is shown in FIG. 7 which illustrates a graph plotting the speeds of the front wheels and the rear wheels of an ATV on a slippery surface when the requested throttle at the throttle operator is reduced to null (i.e., the driver lets go of the throttle lever). As shown, shortly after releasing the throttle at time t=0, both the front wheels and the rear wheels begin decelerating. However, the rear wheels, which are driven by the engine, are subjected to the negative torque output of the engine (due to engine braking) and, because the rear wheels are on a slippery surface, decelerate at a significantly greater rate than the front wheels, resulting in that the speed of the rear wheels drops considerably relative to the speed of the front wheels. At a time $t_r$, the deceleration of the rear wheels stabilizes such that the front wheels and the rear wheels have the same speeds and decelerate at the same rate. However, between the time t=0 up until the time $t_r$, the rear wheels are slipping relative to the surface they are on. That is, the rear wheels are rotating at a speed slower than would be expected for the speed at which the vehicle is travelling.

Thus, in order to avoid wheel slip caused by engine braking certain two-wheel drive vehicles implement an engine control strategy that is generally referred to as a drag torque control (DTC) function. Notably, DTC increases the speed of the engine and its torque output when wheel slip is detected so as to cause the engine to produce a positive torque output rather than a negative torque output. The ATV of the example of FIG. 7 does not implement DTC. Moreover, in some cases, when wheel slip is detected, a gear ratio of a transmission of the vehicle will be up-shifted to a higher gear ratio which has the effect of reducing the negative torque output to the wheels (conversely, a lower gear ratio increases the negative torque output to the wheels).

However, often times, ATVs are equipped with a continuously variable transmission (CVT) that is unassisted, such as a centrifugally actuated (i.e. a centrifugal CVT), such that the gear ratio of the CVT is mechanically adjusted in an automatic manner. In such cases, the gear ratio of the CVT cannot be increased selectively to reduce the negative torque output to the wheels. Rather, centrifugal CVTs will typically lower a gear ratio thereof when the speed of the engine is reduced, as is the case when engine braking occurs, which increases the negative torque output to the wheels thus further exacerbating the problem.

Thus, there is a desire for a method for managing wheel slip in a vehicle having a centrifugal CVT that addresses some of the aforementioned drawbacks.

SUMMARY

It is an object of the present technology to ameliorate at least some of the inconveniences present in the prior art.

According to an aspect of the present technology, there is provided a method of managing wheel slip in a vehicle. The vehicle includes: a frame; an internal combustion engine connected to the frame; front and rear wheels operatively connected to the engine; a throttle valve for controlling a supply of air to the engine; a steering assembly operatively connected to at least the front wheels for steering the vehicle; and an unassisted continuously variable transmission (CVT) operatively connecting the front wheels and the rear wheels to the engine. The method includes: determining a sensed deceleration of the vehicle; comparing the sensed deceleration of the vehicle to a threshold deceleration; and increasing a torque output of the engine from a current engine torque output value to an increased engine torque output value when the sensed deceleration of the vehicle is greater than the threshold deceleration.

In some embodiments of the present technology, increasing the torque output of the engine from the current engine torque output value to the increased engine torque output value includes increasing the torque output of the engine from a negative engine torque output value to a zero or near zero engine torque output value.

In some embodiments of the present technology, the method also includes maintaining the torque output of the engine approximately close to the increased engine torque output value until the sensed deceleration of the vehicle is less than the threshold deceleration of the vehicle.

In some embodiments of the present technology, increasing the torque output of the engine includes moving the throttle valve from a current position to an increased opening position.

In some embodiments of the present technology, the method also includes determining a speed parameter of the vehicle. The speed parameter of the vehicle is one of a sensed speed of the vehicle and a rotational speed representative of a rotational speed of at least one of the front and rear wheels. The threshold deceleration is a predetermined threshold deceleration associated with the speed parameter of the vehicle.

In some embodiments of the present technology, the speed parameter of the vehicle is the sensed speed of the vehicle. Determining the speed parameter of the vehicle includes: sensing a rotational speed representative of the rotational speed of at least one of the front and rear wheels; and calculating the sensed speed of the vehicle based at least in part on the rotational speed representative of the rotational speed of the at least one of the front and rear wheels.

In some embodiments of the present technology, calculating the sensed speed of the vehicle is further based on a steering angle sensed by a steering angle sensor of the steering assembly.

In some embodiments of the present technology, the threshold deceleration is an actual deceleration of the vehicle sensed by an acceleration sensor of the vehicle.

In some embodiments of the present technology, determining the sensed deceleration of the vehicle includes: sensing a rotational speed representative of a rotational speed of at least one of the front and rear wheels; and calculating the sensed deceleration of vehicle based on a reduction of the rotational speed representative of the rotational speed of the at least one of the front and rear wheels.

In some embodiments of the present technology, the predetermined threshold deceleration is a maximum deceleration of the vehicle associated with a throttle request of the vehicle being reduced to null at the determined speed parameter of the vehicle while the vehicle travels on a non-slip surface.

In some embodiments of the present technology, the method also includes determining a brake operation parameter of the vehicle indicative of actuation of brakes of the vehicle. The torque output of the engine is increased from the current engine torque output value to the increased engine torque output value when: the sensed deceleration of the vehicle is greater than the threshold deceleration; and the brake operation parameter of the vehicle is less than a predetermined threshold brake operation parameter.

In some embodiments of the present technology, the brake operation parameter is a pressure measured within a brake fluid circuit of the vehicle, and the predetermined threshold brake operation parameter is a predetermined threshold pressure.

In some embodiments of the present technology, a vehicle includes the frame; a seat connected to the frame; the internal combustion engine connected to the frame; the throttle valve for controlling a supply of air to the engine; the front and rear wheels operatively connected to the engine; the unassisted CVT operatively connecting the front and rear wheels to the engine; and the steering assembly operatively connected to at least the front wheels for steering the vehicle. The CVT includes a drive pulley operatively connected to the engine, a driven pulley operatively connected to the front and rear wheels, and a drive belt wrapped around the drive pulley and the driven pulley. The vehicle also includes an electronic control unit (ECU) including a non-transitory computer-readable medium and a processor configured to perform the method. The vehicle also includes a plurality of sensors for sensing parameters related to operation of the vehicle. The ECU communicates with the plurality of sensors.

According to another aspect of the present technology, there is provided a method of managing wheel slip in a vehicle. The vehicle includes: a frame; an internal combustion engine connected to the frame; front and rear wheels operatively connected to the engine; a throttle valve for controlling a supply of air to the engine; a steering assembly operatively connected to at least the front wheels for steering the vehicle; an unassisted continuously variable transmission (CVT) operatively connecting at least the rear wheels to the engine; and a drive mode switch for selectively setting the vehicle in one of a two-wheel drive mode in which the front wheels or the rear wheels are driven by the engine, and a four-wheel drive mode in which the front wheels and the rear wheels are driven by the engine. The method includes: determining if at least one of the front wheels or the rear wheels is slipping; and increasing a torque output of the engine when the at least one of the front wheels or the rear wheels is determined to be slipping, such that: when the vehicle is in the two-wheel drive mode, the torque output of the engine is increased from a current engine torque output value to a first engine torque output value; and when the vehicle is in the four-wheel drive mode, the torque output of the engine is increased from the current engine torque output value to a second engine torque output value. The second engine torque output value is less than the first engine torque output value.

In some embodiments of the present technology, the first engine torque output value is greater than zero; and the second engine torque output value is near zero or equal to zero.

In some embodiments of the present technology, the method also includes, after increasing the torque output of the engine, maintaining the first engine torque output value or the second engine torque output value such that: when the vehicle is in the two-wheel drive mode, the first engine torque output value is maintained until a difference between a rotational speed representative of a rotational speed of the front wheels and a rotational speed representative of a rotational speed of the rear wheels is less than approximately 30 rpm; and when the vehicle is in the four-wheel drive mode, the second engine torque output value is maintained until a sensed deceleration of the vehicle is less than a threshold deceleration of the vehicle.

In some embodiments of the present technology, when the vehicle is in the two-wheel drive mode, determining if the at least one of the front wheels or the rear wheels is slipping includes: determining a rotational speed representative of a rotational speed of the front wheels; determining a rotational speed representative of a rotational speed of the rear wheels; comparing the rotational speeds representative of the rotational speeds of the front wheels and the rear wheels, whereby driven ones of the front wheels or the rear wheels are determined to be slipping if a difference between the rotational speeds representative of the rotational speeds of the front wheels and the rear wheels is greater than approximately 30 rpm. When the vehicle is in the four-wheel drive mode, determining if the at least one of the front wheels or the rear wheels is slipping includes: determining a sensed deceleration of the vehicle; comparing the sensed deceleration of the vehicle to a threshold deceleration, whereby the front wheels and the rear wheels are determined to be slipping when the sensed deceleration of the vehicle is greater than the threshold deceleration.

In some embodiments of the present technology, the method also includes determining a speed parameter of the vehicle. The speed parameter of the vehicle is one of: a sensed speed of the vehicle; and at least one of the rotational speeds representative of the rotational speeds of the front and rear wheels. The threshold deceleration is a predetermined threshold deceleration associated with the speed parameter of the vehicle.

In some embodiments of the present technology, the speed parameter of the vehicle is the sensed speed of the vehicle. Determining the speed parameter of the vehicle includes: sensing at least one of the rotational speeds representative of the rotational speeds of the front and rear wheels; and calculating the sensed speed of the vehicle based at least in part on the at least one of the rotational speeds representative of the rotational speeds of the front and rear wheels.

In some embodiments of the present technology, calculating the speed of the vehicle is further based on a steering angle sensed by a steering angle sensor of the steering assembly.

In some embodiments of the present technology, the threshold deceleration is an actual deceleration of the vehicle sensed by an acceleration sensor of the vehicle.

In some embodiments of the present technology, determining the sensed deceleration of the vehicle includes: sensing at least one of the rotational speeds representative of the rotational speeds of the front and rear wheels; and calculating the sensed deceleration of the vehicle based on a reduction of the at least one of the rotational speeds representative of the rotational speeds of the front and rear wheels.

In some embodiments of the present technology, the threshold deceleration is a predetermined maximum deceleration of the vehicle associated with a throttle request of the vehicle being reduced to null at the determined speed parameter of the vehicle while the vehicle travels on a non-slip surface.

In some embodiments of the present technology, the method also includes determining a brake operation parameter of the vehicle indicative of actuation of brakes of the vehicle. The torque output of the engine is increased from the current engine torque output value to the first engine torque output value or the second torque output value when: the brake operation parameter of the vehicle is less than a predetermined threshold brake operation parameter.

In some embodiments of the present technology, the brake operation parameter is a pressure measured within a brake fluid circuit of the vehicle and the predetermined threshold brake operation parameter is a predetermined threshold pressure.

In some embodiments of the present technology, a vehicle includes the frame; a seat connected to the frame; the internal combustion engine connected to the frame; the throttle valve for controlling a supply of air to the engine; the front and rear wheels operatively connected to the engine; the unassisted CVT operatively connecting at least the rear wheels to the engine; the steering assembly operatively connected to at least the front wheels for steering the vehicle; the drive mode switch for selectively setting the vehicle in one of: a two-wheel drive mode in which the front wheels or the rear wheels are driven by the engine, and a four-wheel drive mode in which the front wheels and the rear wheels are driven by the engine. The CVT includes a drive pulley operatively connected to the engine; a driven pulley operatively connected to the front and rear wheels; and a drive belt wrapped around the drive pulley and the driven pulley. The vehicle also includes an electronic control unit (ECU) including: a non-transitory computer-readable medium; and a processor configured to perform the method. The vehicle also includes a plurality of sensors for sensing parameters related to operation of the vehicle. The ECU communicates with the plurality of sensors.

For purposes of the present application, terms related to spatial orientation when referring to a vehicle and components in relation to the vehicle, such as "forwardly", "rearwardly", "left", "right", "above" and "below", are as they would be understood by a driver of the vehicle sitting thereon in an upright driving position, with the vehicle steered straight-ahead.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIGS. 9A to 9D are graphs showing operation parameters of the vehicle of FIG. 1 when undergoing wheel slip in a two-wheel drive mode;

FIG. 11 is an example of a look-up table used in the method of FIG. 8.

DETAILED DESCRIPTION

The present technology will be described with reference to a four-wheeled straddle-seat all-terrain vehicle (ATV) 10. However, it is contemplated that aspects of the present technology could be used in other types of four-wheeled off-road vehicles, such as side-by-side vehicles, dune buggies, and the like.

Figure 1:
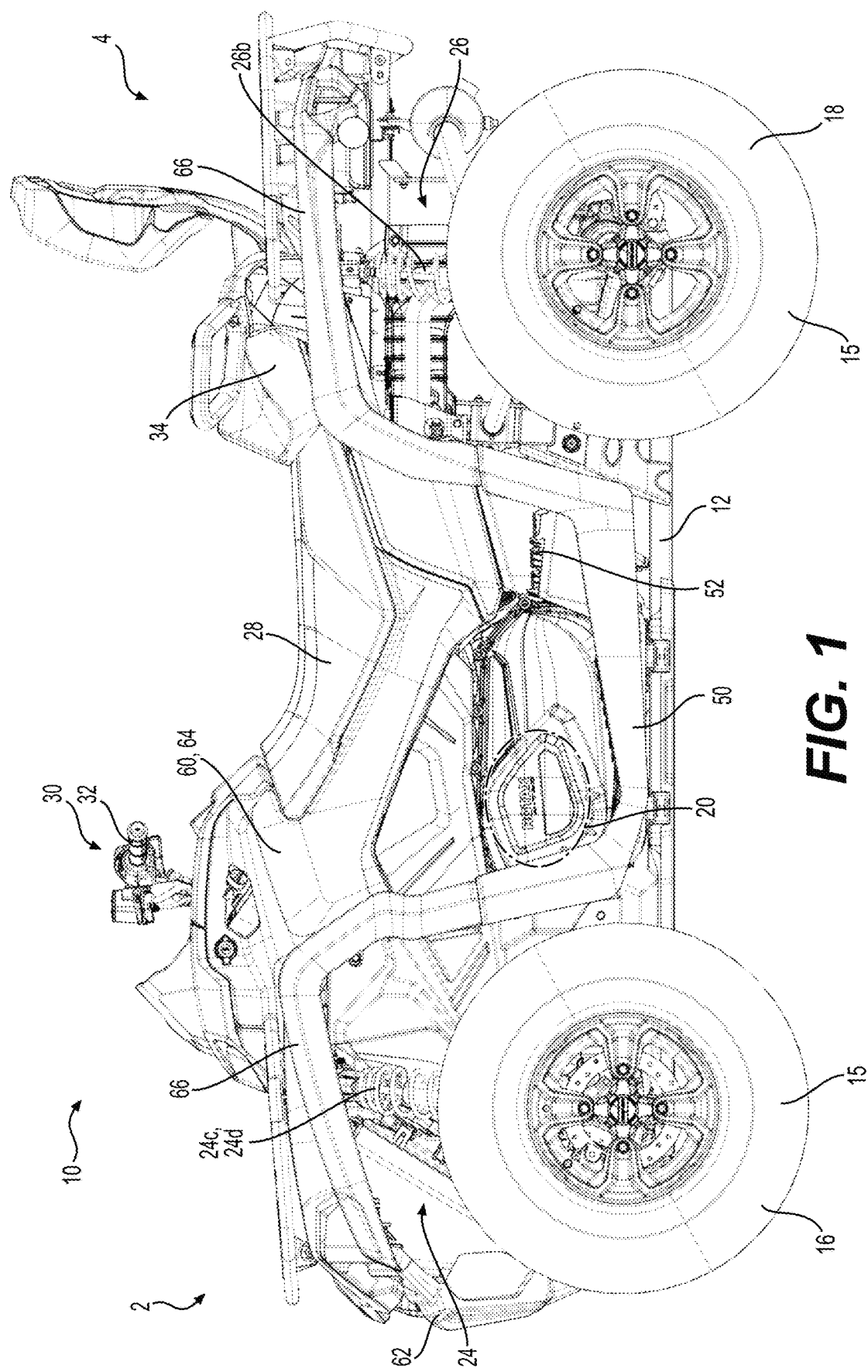
FIG. 1 is a left side elevation view of an all-terrain vehicle (ATV)

With reference to FIG. 1, the ATV 10 has a front end 2 and a rear end 4 defined consistently with a forward travel direction of the ATV 10. The ATV 10 has a frame 12 to which a vehicle body is mounted. A pair of front wheels 16 is suspended from the front portion of the frame 12 via front suspensions 24. A pair of rear wheels 18 is suspended from the rear portion of the frame 12 via rear suspensions 26. Each of the wheels 16, 18 has a tire 15 adapted for off-road conditions and traversing rugged terrain.

As illustrated in FIG. 1, the ATV 10 also includes fairings 60 including a front fascia 62 at the front end 2 of the ATV 10 and several side panels 64 extending over lateral sides of the ATV 10. A fender 66 is disposed over each wheel 16, 18 to protect the driver and/or passenger from dirt, water and other debris being projected by the rotating wheels 16, 18. The ATV 10 further includes a straddle-type driver seat 28 mounted to the frame 12 for accommodating a driver of the ATV 10. Driver footrests 50 are provided on either side of the driver seat 28 and are disposed vertically lower than the driver seat 28 to support the driver's feet. Another straddle-type passenger seat 34 is provided behind the driver seat 28 to accommodate a passenger. A passenger footrest 52 is provided longitudinally rearward of each of the left and right driver footrests 50. The passenger footrests 52 are disposed slightly higher than the driver footrests 50 and designed to accommodate the feet of a passenger seated on the passenger seat 34 which is disposed slightly vertically higher than the driver seat 28. It is contemplated that the passenger seat 34 and the passenger footrests 52 could be omitted.

Figure 2:
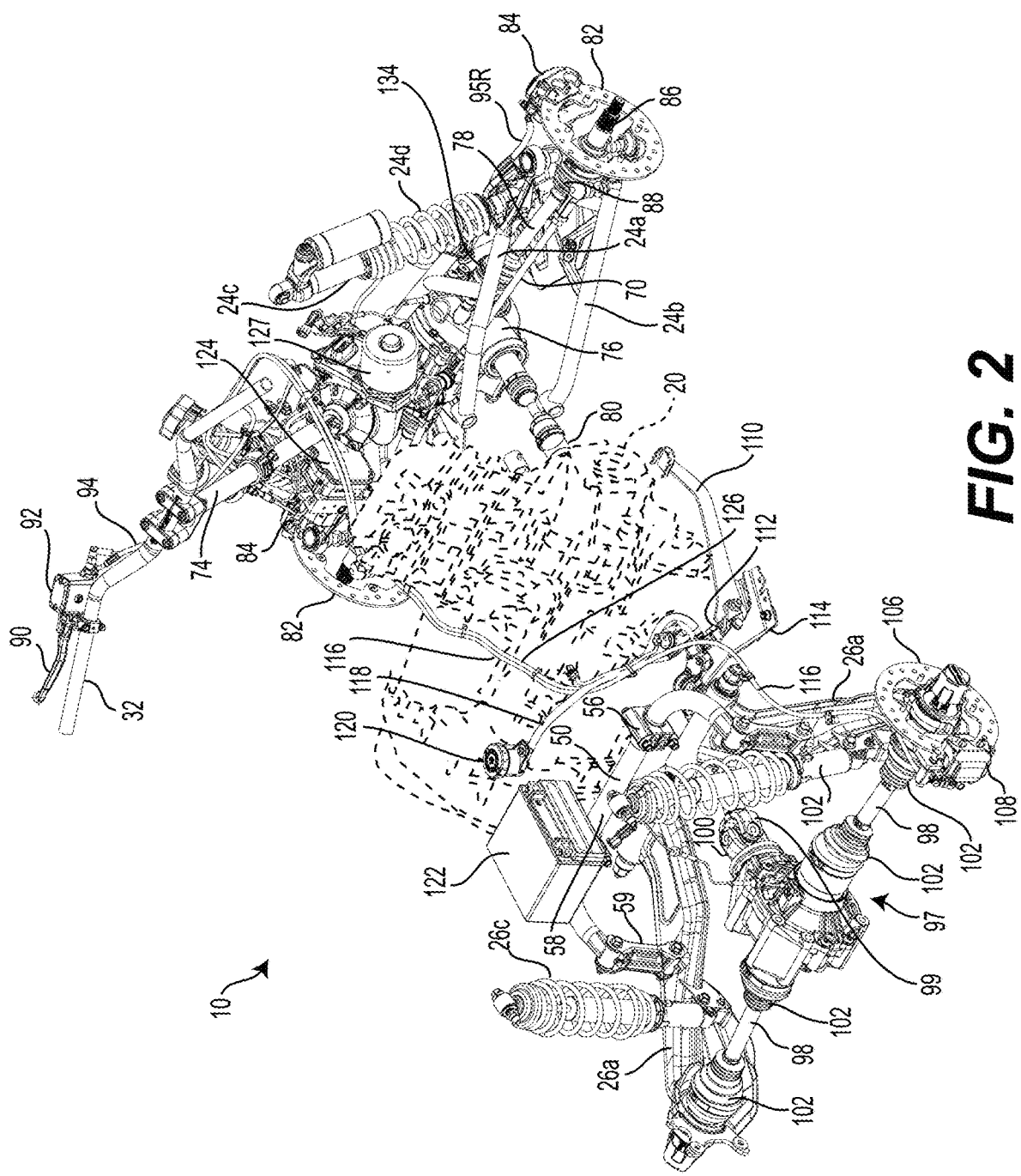
FIG. 2 is a perspective view, taken from a rear right side, of suspension assemblies, brake assemblies, and steering components of the vehicle of FIG. 1.
Figure 3:
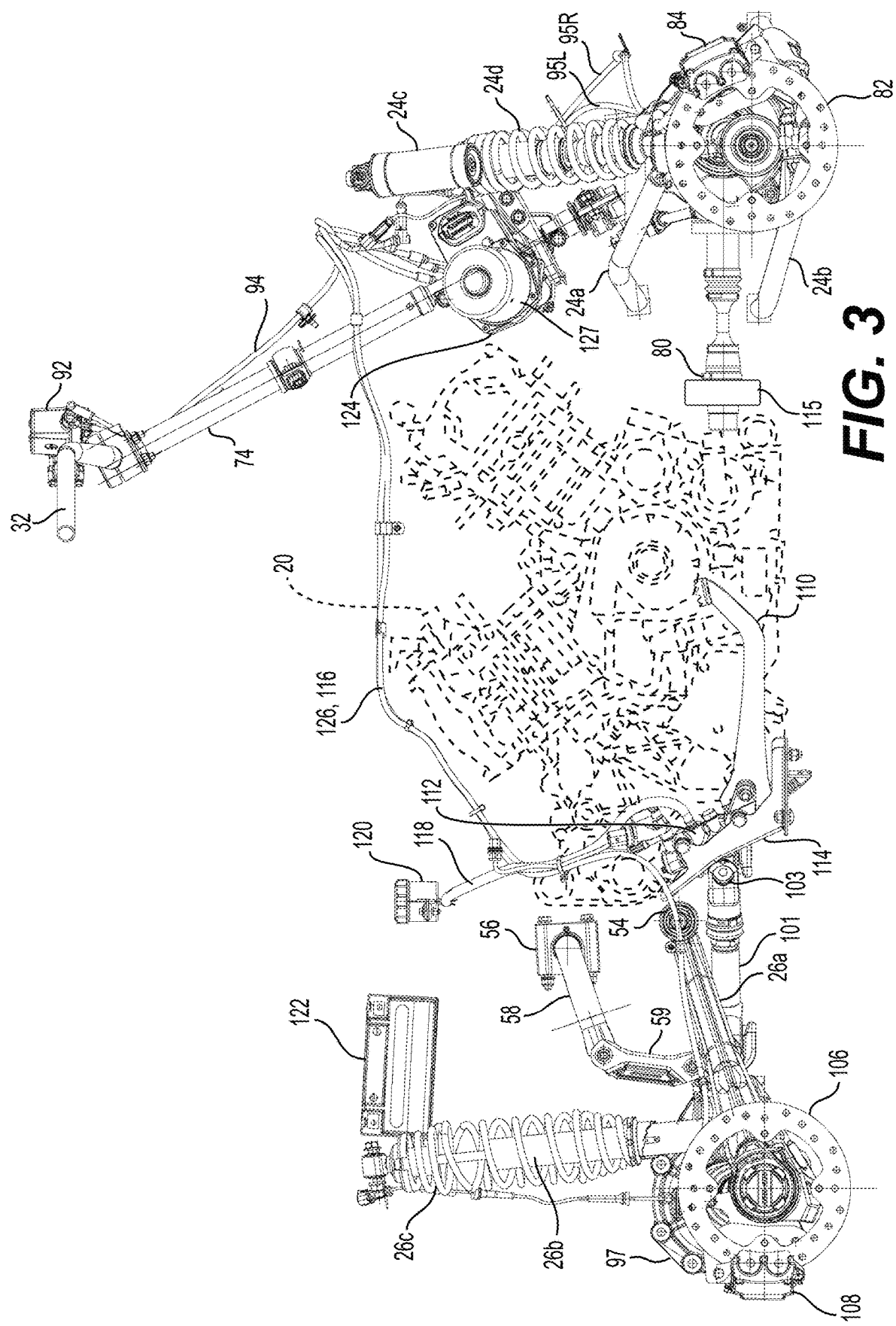
FIG. 3 is a right side elevation view of the components of FIG. 2.
Figure 4:
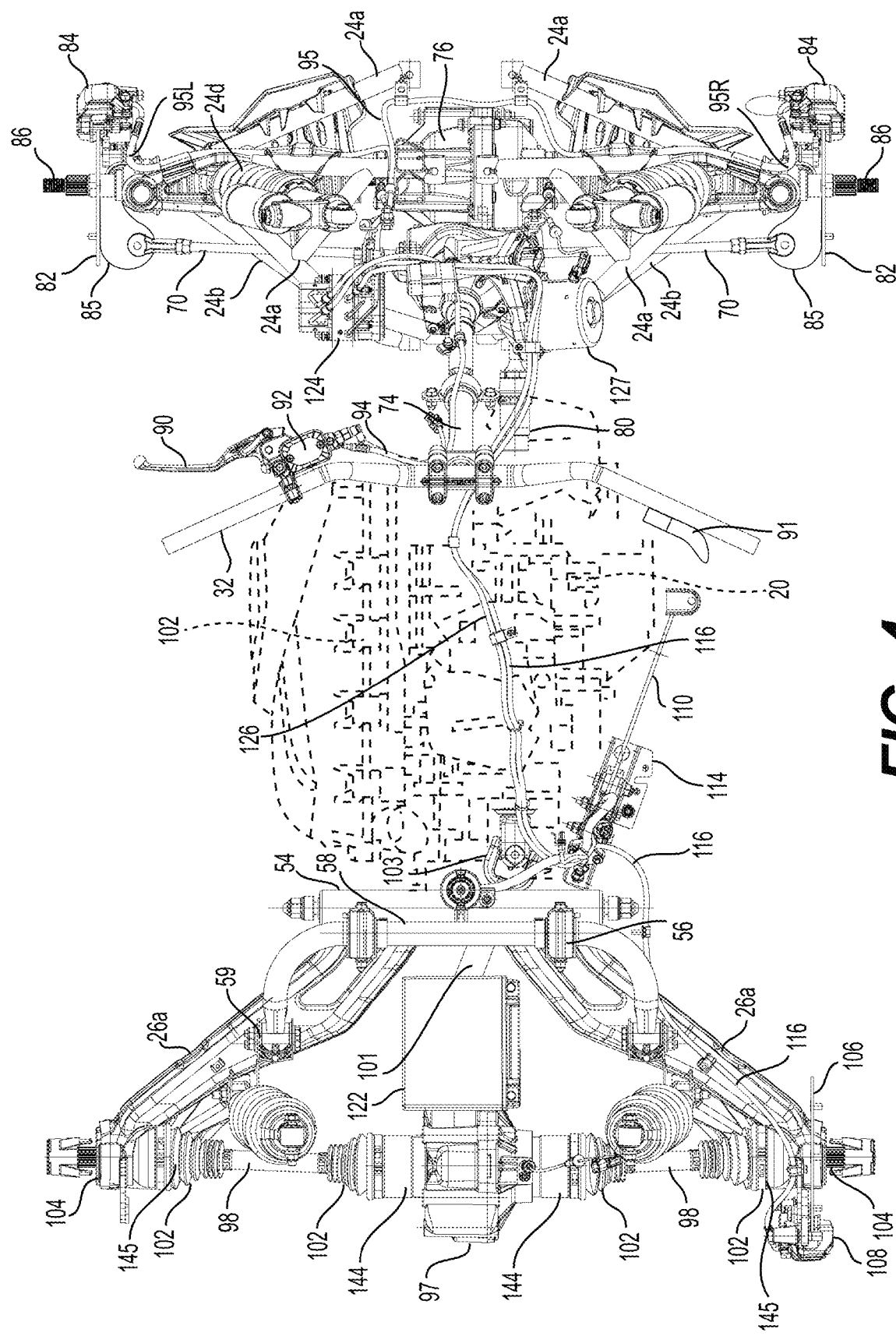
FIG. 4 is a top plan view of the components of FIG. 2.

As shown in FIGS. 2 to 4, each front suspension assembly 24 includes an upper A-arm 24a, a lower A-arm 24b, a front shock absorber 24c and a front coil spring 24d. The front coil spring 24d is mounted over the front shock absorber 24c. The front coil spring 24d and the front shock absorber 24c are both pivotably connected at their lower ends to the upper A-arm 24a and at their upper ends to the frame 12. The upper and lower A-arms 24a, 24b each have one end pivotably connected to the frame 12, a kingpin 85 (FIG. 4) being mounted to each opposed ends of the upper and lower A-arms 24a and 24b. Each front wheel 18 is supported in part by a corresponding kingpin 85.

As shown in FIGS. 2 to 4, each rear suspension assembly 26 comprises a swing arm 26a, a rear shock absorber 26b and a rear coil spring 26c. Each swing arm 26a has one end pivotably connected to the frame 12, about a pivot axis 54 located in front of the rear wheels 18 and extending generally laterally within the frame 12, and an opposite end supporting a wheel shaft 104 of its corresponding rear wheel 18. Each swing arm 26a is connected at mid-length to a torsion bar 58 by links 59. The torsion bar 58 is mounted to the frame 12 via supports 56. For each rear suspension assembly 26, the rear shock absorber 26b and the rear coil spring 26c each have one end pivotably connected to the frame 12 and the other end pivotably connected to its corresponding swing arm 26a near an opposed end thereof.

A steering assembly 30 is rotationally supported by the frame 12 to enable a driver to steer the ATV 10. The steering assembly 30 includes a handlebar assembly including a handlebar 32 connected to a steering column 74 for actuating steering linkages 70 operably connected to left and right front wheels 16. As shown in FIGS. 2 and 3, in this embodiment, the steering assembly 30 includes a power steering electric motor 127 mounted to the steering column 74 for facilitating steering. The power steering electric motor 127 is operatively connected to the steering column 74 and to the left and right front wheels 16 via the steering linkages 70.

As shown in FIG. 4, a throttle operator 91 in the form of a thumb-actuated throttle lever is provided near the right end of the handlebar 32. Other types of throttle operators, such as a finger-actuated throttle lever and a twist grip, are also contemplated. The throttle operator 91 is selectively actuated by the driver of the ATV 10 to request throttle from the engine. More specifically, a throttle operator position sensor 85 (FIG. 6) is operatively connected to the throttle operator 91 to sense movement thereof caused by the driver in operation. The sensed input from the throttle operator position sensor 85 is transmitted to an electronic control unit (ECU) 200 which, as will be described in greater detail below, controls operation of the ATV's engine 20.

A steering angle sensor 250 (FIG. 6) is disposed within a housing of the power steering electric motor 127 and is configured to sense an angle of the steering column 74. A wheel steering angle associated with the front wheels 16 of the ATV 10 is determined based on the angle sensed by the steering angle sensor 250.

A display cluster 125 (schematically illustrated in FIG. 6) is located forwardly of the handlebar assembly for displaying information to the driver.

An internal combustion engine 20 is mounted to the middle portion of the frame 12 and, as will be described in greater detail below, is operatively connected to the front and rear wheels 16, 18 in order to propel the ATV 10. In this embodiment, the engine 20 is a V-type engine having two cylinders. The cylinders are disposed at an angle to each other. Each cylinder has an intake port (not shown) connected to an air induction system delivering air into the engine 20. Each cylinder has a fuel injector injecting fuel into the engine 20 and a spark plug igniting the fuel-air mixture to initiate the combustion cycle. Each cylinder has an exhaust port connected to an exhaust manifold through which the exhaust gases are removed from the engine 20. It is contemplated that other types of internal combustion engine could be used, such as, for example, an inline engine. It is also contemplated that the engine 20 could have more than two cylinders.

An air induction system of the engine 20 includes an intake manifold, a plenum chamber connected upstream of the intake manifold and a throttle body 68 (schematically shown in FIG. 6) connected upstream of the plenum chamber. When the engine 20 is operating, air flows sequentially through the throttle body 68, the plenum chamber, the intake manifold and then through the intake ports into the cylinders of the engine 20. The intake manifold separates the flow of air into multiple branches, each of the branches being connected to an air intake port of a corresponding cylinder of the engine 20. The plenum chamber equalizes the pressure of air entering the cylinders and also acts as an acoustic silencer to dampen the noise generated by the engine 20.

Figure 6:
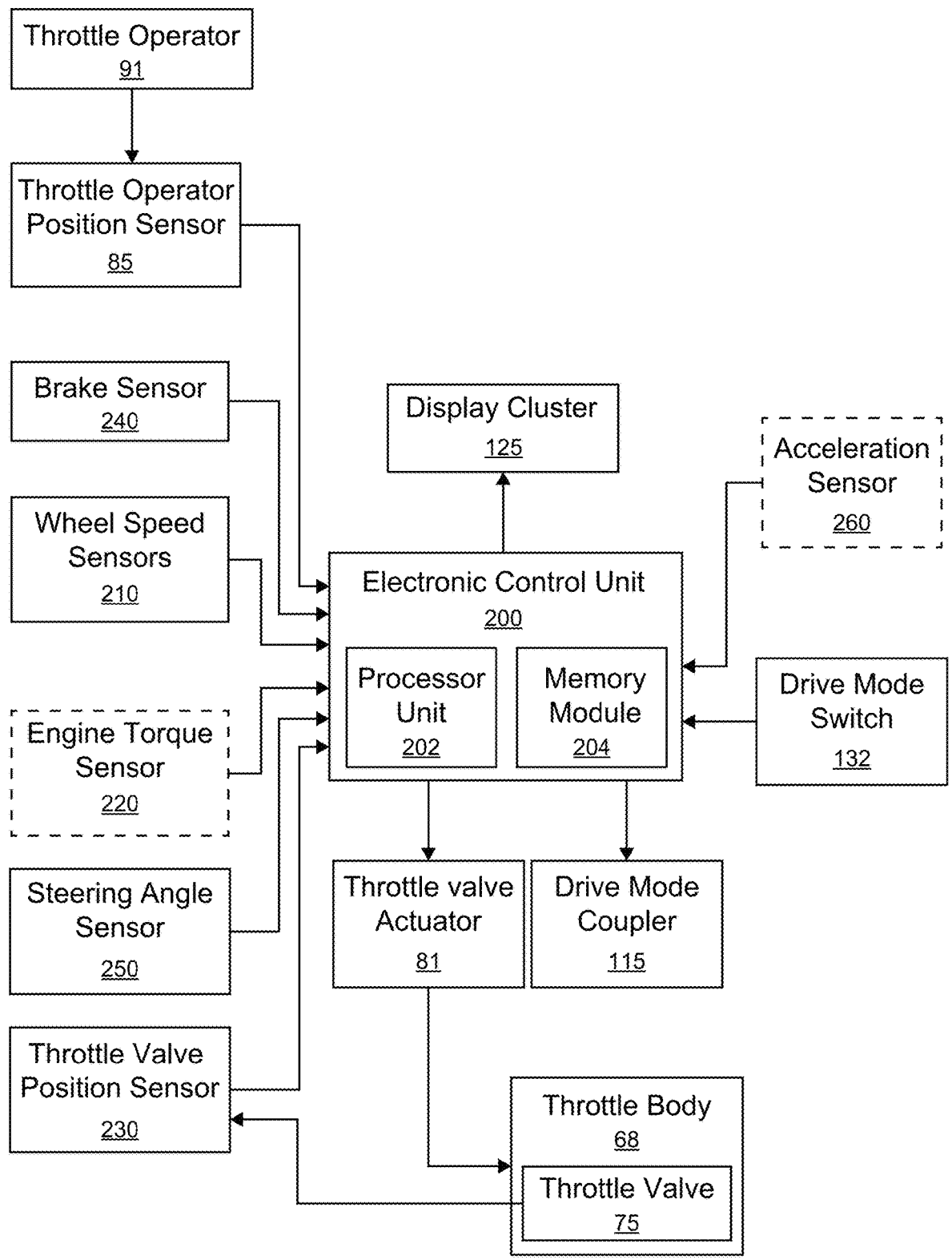
FIG. 6 is a schematic representation of various sensors and other components of the vehicle of FIG. 1.
Figure 7:
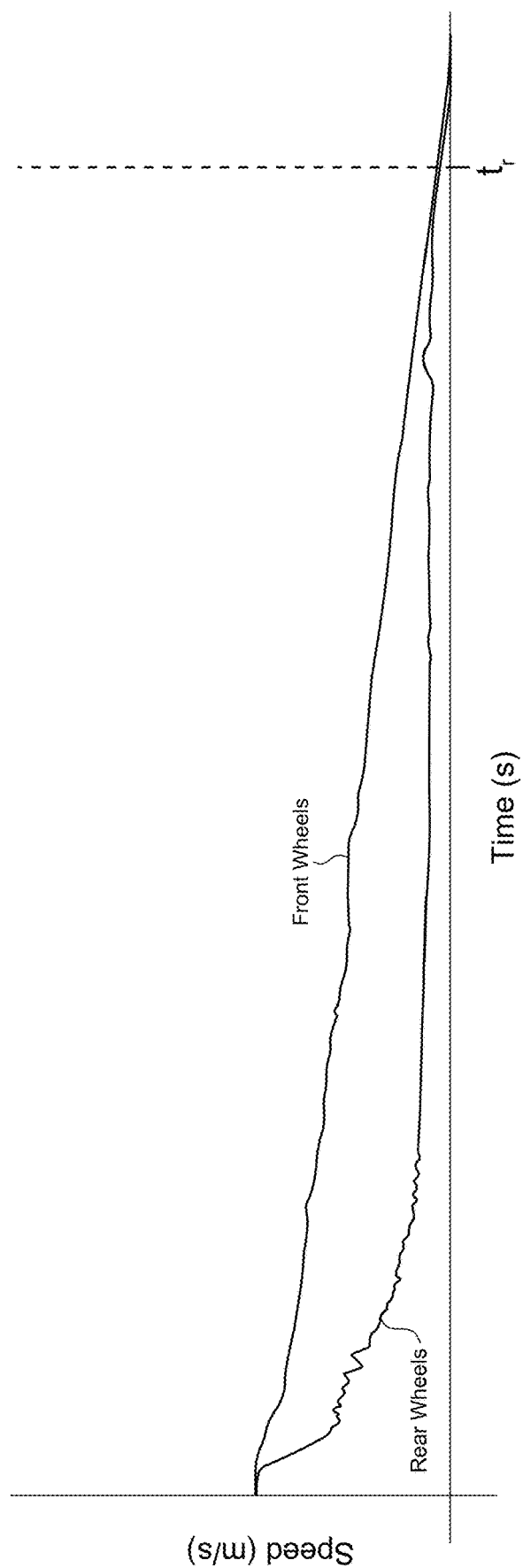
FIG. 7 is a graph representing the speeds of front and rear wheels of a prior art ATV in rear-wheel drive when undergoing wheel slip due to engine braking.

The throttle body 68 regulates the flow of air to the engine 20. The throttle body 68 includes a throttle valve 75 (FIG. 6). Adjusting the position of the throttle valve 75 inside the throttle body 68 regulates air flow through the throttle body 68 to the engine 20. A throttle valve actuator 81 (e.g., an electric motor) is mounted to a right side of the throttle body 68 and is operatively connected to the throttle valve 75 to pivot the throttle valve 75 inside the throttle body 68.

The throttle valve actuator 81 positions the throttle valve 75 based at least in part on the position of the throttle operator 91. Notably, as described above, the throttle operator position sensor 85 senses a position of the throttle operator 91 and sends a throttle operator position signal representative of this position to the ECU 200. The ECU 200 sends a signal to the throttle valve actuator 81 to adjust the position of the throttle valve 75 and thus an opening of the throttle body 68. A throttle valve position sensor 230 (FIG. 6) senses the position of the throttle valve 75 in the throttle body 68 and sends a throttle valve position signal representative of this position to the ECU 200.

Engine power, torque and engine speed are determined in part by the fuel-air mixture in the engine 20 and the ignition timing. The ECU 200 therefore regulates fuel injection into the engine 20 as well as the ignition timing by controlling operation of the fuel injectors and the spark plug.

Figure 5:
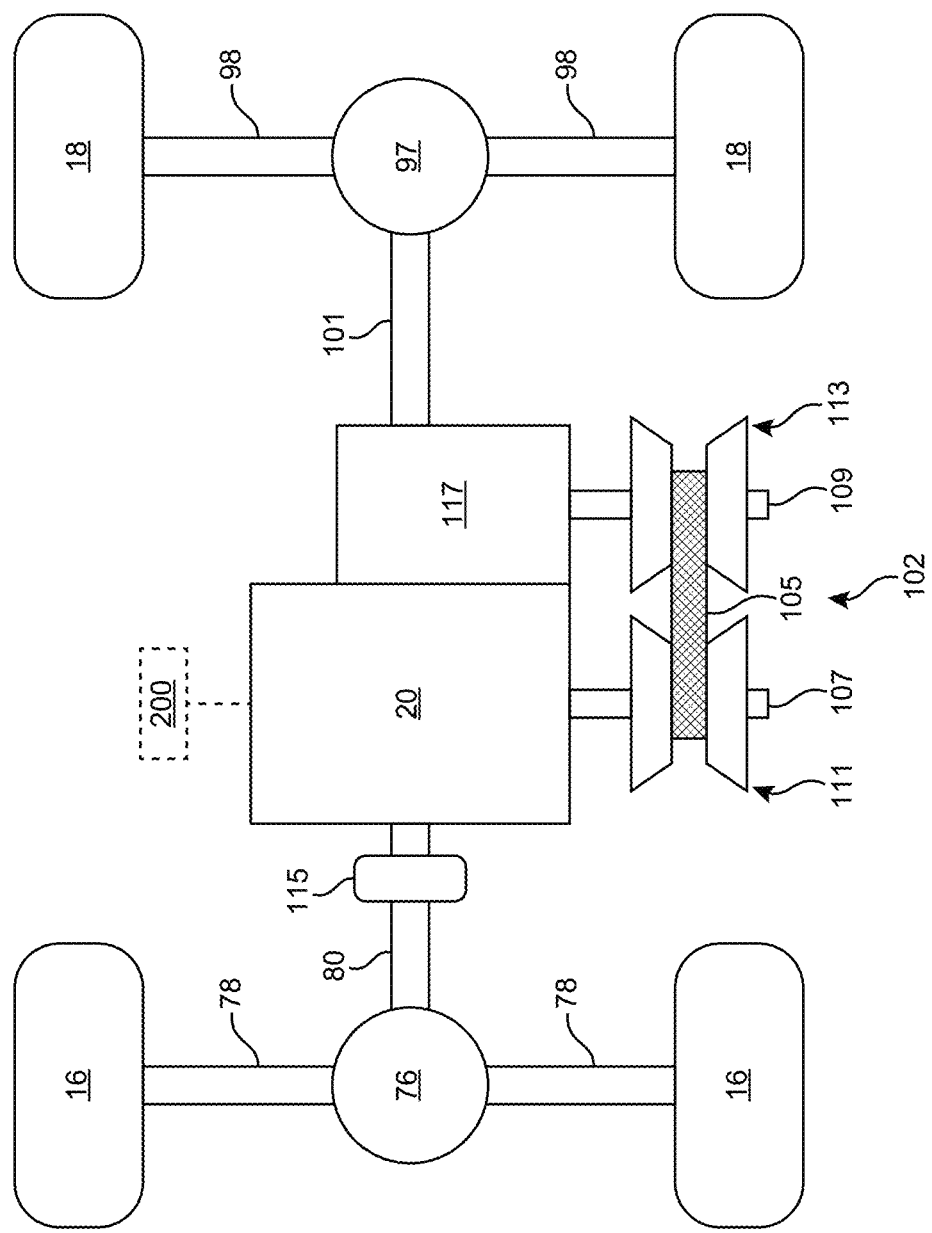
FIG. 5 is a schematic representation of part of a powertrain of the vehicle of FIG. 1.

With reference to FIG. 5, which illustrates a diagrammatic representation of a powertrain of the ATV 10, the powertrain of the ATV 10 includes the engine 20, a continuously variably transmission (CVT) 102 and a transmission 117. An output shaft 107 of the engine 20 is connected to the CVT 102 which, as will be described in greater detail below, is in turn connected to the transmission 117.

A gear selector handle (not shown) is configured to be selectively moved between positions P, N, R, L, H (respectively corresponding to a parking, neutral, reverse, low and high gears) and allows the driver of the ATV 10 to make a gear selection. It is contemplated that the sequence of gears could be different. The gear selector handle is connected to the transmission 117 for effecting the gear selection. The transmission 117 is disposed rearward of the engine 20. The transmission 117 transfers torque from the transversely extending driven shaft 109 to the longitudinally extending front and rear driveshafts (not shown). The transmission 117 includes different gear sets, the combination of the gear sets being selected based on the position of the gear selector.

As shown in FIG. 5, the CVT 102 is disposed on a left side of the engine 20. The CVT 102 includes a drive pulley 111 disposed on the output shaft 107 of the engine 20, a driven pulley 113 disposed on a driven shaft 109 for rotation therewith, and a CVT belt 105 disposed around both pulleys 111, 113 to transmit torque from the drive pulley 111 to the driven pulley 113. A cover (not shown) disposed over the CVT 102 is connected to both the engine 20 and the transmission 117. The driven shaft 109 is connected to the transmission 117 for transmitting thereto the torque output of the engine 20.

Each of the pulleys 111, 113 includes a movable sheave that can move axially relative to a fixed sheave to modify an effective diameter of the corresponding pulley 111, 113. The drive pulley 111 is a centrifugal pulley in that the sheaves thereof move in response to a centrifugal force applied thereon caused by changes in engine speed and torque requirement of the wheels 16, 18. The effective diameters of the pulleys 111, 113 are in inverse relationship. In the illustrated embodiment, the CVT 102 is a purely mechanical CVT 102, in which the diameter of the drive pulley 111 increases with increasing rotational speed of the drive pulley 111 (i.e. with increasing engine speed). The diameter of the driven pulley 113 therefore decreases when the torque required at the driven shaft 109 (connected to the wheels 16, 18) increases. The CVT 102 may thus be referred to as an "unassisted" CVT in that a gear ratio of the CVT 102 (i.e., an effective diameter of the driven pulley 113 over the effective diameter of the drive pulley 111) is automatically mechanically adjusted in accordance with the speed of the engine 20 and the torque requirement of the wheels 16, 18.

As shown in FIGS. 2 and 4, the ATV 10 has a front differential 76 adapted to receive, via a driveshaft 80 a torque from the engine 20. On each of its left and right sides, the front differential 76 is connected to a constant velocity (CV) joint 134 (FIG. 2) connected to one end of a respective half shaft 78. Another CV joint 88 is connected to an opposed end of each half shaft 78. A wheel shaft 86 passing through and supported by a corresponding kingpin 85 is connected to each CV joint 88. A front wheel 16 and a front disc 82 are mounted to each wheel shaft 86. On each side of the front differential 76, the front wheel 16, the disc 82, the CV joint 88, the half shaft 78 and the CV joint 134 are operably connected to rotate together, at a common speed. The torque from the engine 16 is received at the driveshaft 80 (which may be referred to as an "input" shaft of the front differential 76) when the ATV 10 is in the four-wheel drive mode. In turn, the front differential 76 transmits the torque to the front wheels 16 via the CV joints 134, the front half shafts 78, the CV joints 88 and the wheel shafts 86. Depending on riding conditions, the front differential 76 may send unequal torque to the two front wheels 16 so that the left front wheel 16 and the right front wheel 16 may rotate at different speeds. Left and right front brake assemblies include the discs 82 and further include calipers 84 mounted on the kingpins 85. As shown in FIGS. 3 and 4, the left and right front calipers 84 are respectively connected to hoses 95L and 95R. Each caliper 84 includes a pair of brake pads positioned on opposite sides of the respective disc 82. Actuating the calipers 84 by application of a fluid pressure in the hoses 95L and/or 95R causes the brake pads to apply pressure on the respective discs 82.

It is contemplated that, in some embodiments, the differential 76 could be a locking differential whereby the differential can be switched between a locked configuration and an open configuration. In the locked configuration, the wheels 16 are locked into the same rate of rotation and both wheels 16 receive the same amount of power. In the open configuration, the wheels 16 are allowed to freely rotate at different rates, similar to an open differential, for example for negotiating a turn.

The ATV 10 includes a rear spool gear (not shown) enclosed within a housing 97. An input shaft 100 of the spool gear is operably connected to a shaft 101 by a universal joint 99 (FIG. 2). The shaft 101 is connected by a universal joint 103 (FIG. 3) to the transmission 117 to receive an input torque from the engine 20. As shown in FIG. 4, on each of its left and right sides, the spool gear is connected to a CV joint 144 connected to one end of a respective half shaft 98. Another CV joint 145 is connected to an opposed end of each half shaft 98. The CV joints 144, 145 are protected by boot covers 102. A wheel shaft 104 passing through and supported by a lower end of a corresponding swing arm 26a is connected to each CV joint 145. A rear wheel 18 is mounted to each wheel shaft 104.

The spool gear transmits the torque received from the engine 20 to the left and right rear wheels 18. The spool gear causes the CV joints 144, the half shafts 98, the CV joints 145, the wheel shafts 104 and the rear wheels 18 located on both left and right sides of the ATV 10, as well as a single disc 106, to rotate together, at a common speed. Alternatively, in some embodiments, the torque from the engine 20 could be transmitted to the rear wheels 18 by an open differential, a limited slip differential, or a locking differential.

The ATV 10 can be operated in a rear-wheel drive mode (i.e., a two-wheel drive mode) in which the rear wheels 18 are driven by the engine 20 or in a four-wheel drive mode in which the front wheels 16 and the rear wheels 18 are driven by the engine 20. To that end, in this embodiment, the transmission 117 is selectively connected to the front wheels 16 via a drive mode coupler 115, shown schematically in FIGS. 3, 5 and 6. As depicted in FIG. 6, the drive mode coupler 115 is controlled by the ECU 200 and is selectively actuated to cause the ATV 10 to change from the two-wheel drive mode configuration to the four-wheel drive mode configuration by selectively coupling the front wheels 16 to the transmission 117 for selectively driving the front wheels 16. Such drive mode couplers are known in the art and will thus not be described in detail herein.

Therefore, when the ATV 10 is in the two-wheel drive mode, a torque output of the engine 20 is applied via the CVT 102 and the transmission 117 to the left and right rear wheels 18. Conversely, when the ATV 10 is in the four-wheel drive mode, a portion of the torque output of the engine 20 is applied to each of the front wheels 16 and rear wheels 18 via the CVT 102 and the transmission 117.

The selection between the drive modes is made by the driver using a drive mode switch 132 provided in the vicinity of the driver of the ATV 10. In this embodiment, the drive mode switch 132 is a toggle switch mounted on a dashboard of the ATV 10. The drive mode switch 132 has two (2) positions: a two-wheel drive mode position for selecting the two-wheel drive mode and a four-wheel drive mode position for selecting the four-wheel drive mode. It is contemplated that the drive mode switch 132 could be any different type of control mechanism, including for example a rotary knob or a press button.

Another switch (not shown) may also be provided on the dashboard for manually locking and unlocking the differential 76, as mentioned above, in embodiments in which the differential 76 is a locking differential.

While the ATV 10 is described with the rear wheels 18 driving the vehicle when in the two-wheel drive mode, it is contemplated that the ATV 10 could implement a front wheel drive mode in other embodiments (i.e., in the two-wheel drive mode, the front wheels 16 are driven by the engine 20 rather than the rear wheels 18).

At the rear of the ATV 10, a single rear brake assembly is provided. The single rear brake assembly includes the single disc 106 and a single caliper 108. Although the single disc 106 as illustrated is located on the right-hand side of the ATV 10, mounting the single disc 106 on the left-hand side of the ATV 10 is also contemplated. The single caliper 108 is supported by the right swing arm 26a. The single disc 106 is operatively connected to the right swing arm 26a via a bearing (not shown) for the right wheel shaft 104. The single caliper 108 is connected to a hose 116. The single caliper 108 includes a pair of brake pads 113 positioned on opposite sides of the single disc 106. Actuating the single caliper 108 by application of a fluid pressure in the hose 116 causes the brake pads 113 to apply pressure on the single disc 106. No rear brake assembly is present on the left-hand side of the ATV 10, where the left rear wheel 18 is supported by the left swing arm 26a.

A user of the ATV 10 may actuate either or both of two (2) user actuated braking input devices, for example a hand lever 90 and a foot lever 110, to independently or jointly deliver a braking command for slowing down or stopping the ATV 10. The hand lever 90 and a front master cylinder 92 are mounted on one of the handlebars 32. The front master cylinder 92 can be directly filled with braking oil. Actuating the hand lever 90 causes the front master cylinder 92 to transmit the braking command to a braking control unit 124. In the implementation as shown, the braking command from the hand lever 90 is in the form of a fluid pressure in a hose 94 connected between the front master cylinder 92 and the braking control unit 124. In another implementation, actuation of the hand lever 90 may cause the application of a tension on a cable to deliver the braking command to the braking control unit 124. An alternative implementation where the braking system is a brake-by-wire system in which the hand lever 90 delivers the braking command in the form of an electric or optical signal to the braking control unit 124 is also contemplated. The braking command is proportional (either linearly or non-linearly) to the force applied on the hand lever 90. When the hand lever 90 is actuated, a signal is sent for turning on brake lights (not shown).

The foot lever 110 and a rear master cylinder 112 are mounted on a bracket 114 supported by the lower portion of the frame 12. The rear master cylinder 112 receives braking oil via a hose 118 from a reservoir 120. Actuating the foot lever 110 causes the rear master cylinder 112 to exert a fluid pressure in a hose 126, also resulting in the delivery of the braking command to the braking control unit 124. As in the case of the hand lever 90, implementations of the foot lever 110 applying the braking command to the braking control unit 124 by the application of a tension on a cable or in the form of an electric or optical signal are also contemplated. The braking command is proportional (either linearly or non-linearly) to the force applied on the foot lever 110. When the foot lever 110 is actuated, a signal is sent for turning on the brake lights.

The ATV 10 is equipped with an anti-lock braking system (ABS). Consequently, a controller (not shown) causes a hydraulic module to apply the first, second and third fluid pressures in the hoses 95L, 95R and 116, respectively, in a selective manner, depending at least in part on speed measurements for the front and rear wheels 16, 18 of the ATV 10.

A battery 122 is provided at the rear of the ATV 10 to energize electrical components of the ATV 10.

As shown in FIG. 6, the ECU 200 has a processor unit 202 for carrying out executable code, and a non-transitory memory module 204 that stores the executable code in a non-transitory medium (not shown) included in the memory module 204. The processor unit 202 includes one or more processors for performing processing operations that implement functionality of the ECU 200. The processor unit 202 may be a general-purpose processor or may be a specific-purpose processor comprising one or more preprogrammed hardware or firmware elements (e.g., application-specific integrated circuits (ASICs), electrically erasable programmable read-only memories (EEPROMs), etc.) or other related elements. The non-transitory medium of the memory module 204 may be a semiconductor memory (e.g., read-only memory (ROM) and/or random-access memory (RAM)), a magnetic storage medium, an optical storage medium, and/or any other suitable type of memory. While the ECU 200 is represented as being one entity in this implementation, it is understood that the ECU 200 could comprise separate entities for controlling components separately.

The ECU 200 is in communication with a plurality of sensors of the ATV 10 in order to control operation of the ATV 10. For instance, as shown in FIG. 6, the ECU 200 is in communication with, amongst other sensors, the throttle operator position sensor 85, a brake sensor 240 for sensing actuation of the brakes of the ATV 10, wheel speed sensors 210 for sensing rotational speeds representative of the rotational speeds of the front wheels 16 and the rear wheels 18, an optional engine torque sensor 220 to sense a torque output of the engine 20, the throttle valve position sensor 230, the steering angle sensor 250, and an optional acceleration sensor 260. Other sensors are also contemplated.

In this embodiment, the rotational speeds representative of the rotational speeds of the front and rear wheels 16, 18 that are sensed by the wheel speed sensors 210 are the rotational speeds of the front and rear wheels 16, 18. In other embodiments, the rotational speeds representative of the rotational speeds of the front and rear wheels 16, 18 could be the rotational speeds of the wheels 16, 18, or the rotational speeds of shafts connected to the wheels 16, 18, or the rotational speeds of the driven pulley 113 connected to the wheels 16, 18, or any other speeds from which the rotational speeds of the wheels 16, 18 could be inferred.

The ATV 10 includes other components such as an exhaust system, radiators, headlights, and the like. As it is believed that these components would be readily recognized by one of ordinary skill in the art, further explanation and description of these components will not be provided herein.

As will be explained in greater detail below, in this embodiment, the ECU 200 implements a method 500 for managing wheel slip in the ATV 10. Generally speaking, the method 500 implements a drag torque control (DTC) function to prevent or otherwise reduce wheel slip due to engine braking.

Figure 8:
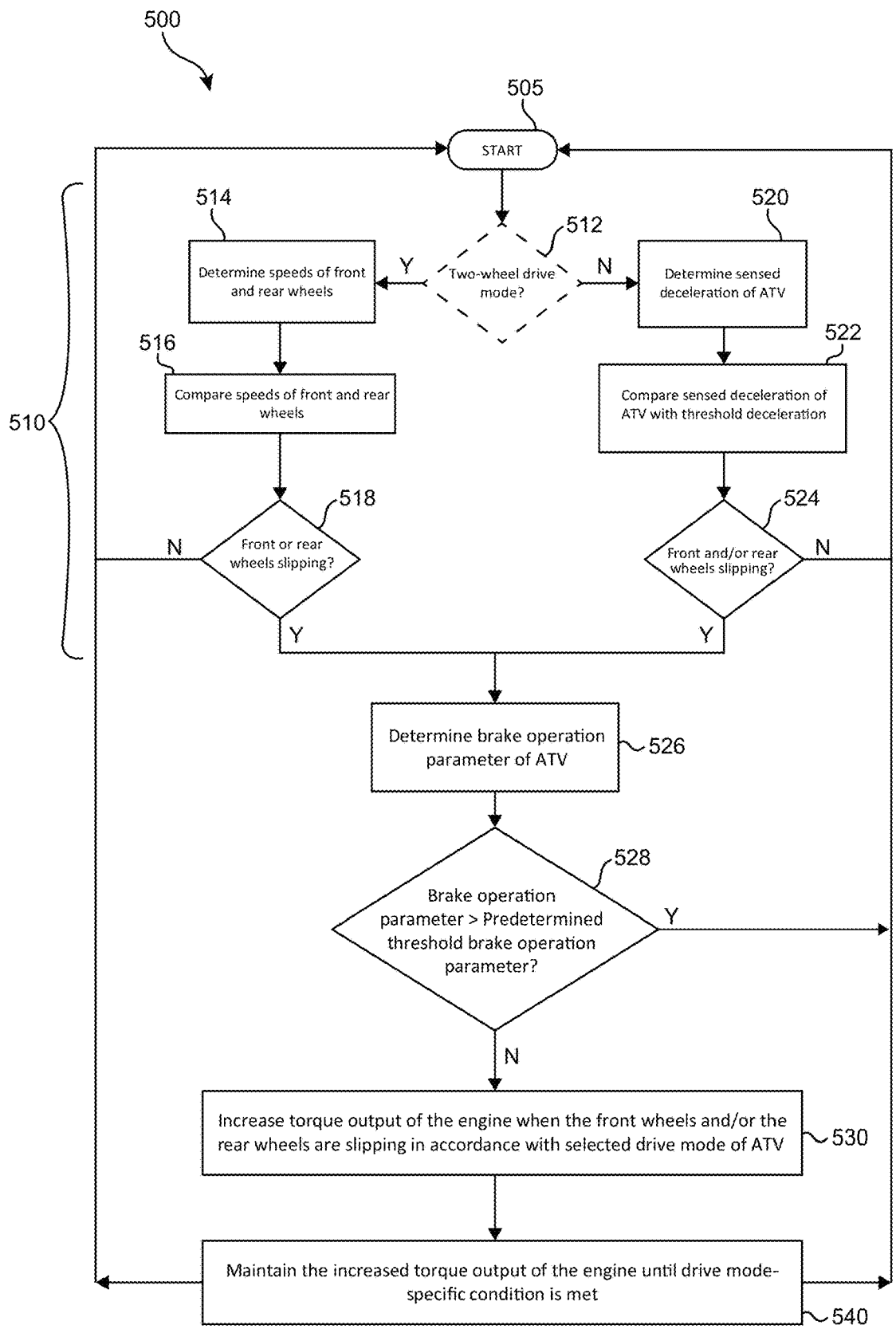
FIG. 8 is a block diagram representation of a method implemented by an electronic control unit of the vehicle of FIG. 1.

With reference to FIG. 8, the method 500 in according with the present embodiment begins at 505.

At general step 510, the method 500 involves determining if the front wheels 16 and/or the rear wheels 18 are slipping. As will be set out below, in some embodiments, the manner in which this determination is made depends on the drive mode in which the vehicle 10 has been set by the drive mode switch 132 (i.e., two-wheel drive mode or four-wheel drive mode).

Thus, at 512, the ECU 200 first determines if the ATV 10 is in the two-wheel drive mode or the four-wheel drive mode based on the input from the drive mode switch 132.

When the ATV 10 is in the two-wheel drive mode such that only the rear wheels 18 are driven by the engine 20, the front wheels 16 are presumed not to be slipping since the engine braking does not affect the front wheels 16 (since the front wheels 16 are not driven by the engine 20). Thus, whether the rear wheels 18 are slipping may generally be determined by comparing the speeds of the front and rear wheels 16, 18.

Therefore, when the ATV 10 is in the two-wheel drive mode, the method proceeds to 514 where rotational speeds representative of the rotational speeds of the front wheels 16 and the rear wheels 18 are determined. The rotational speeds representative of the rotational speeds of the front wheels 16 and the rear wheels 18 are sensed by the wheel speed sensors 210. As such, as described above, the rotational speeds representative of the rotational speeds of the front and rear wheels 16, 18 could be the rotational speeds of the wheels 16, 18, or the rotational speeds of shafts connected to the wheels 16, 18, or the rotational speeds of pulleys connected to the wheels 16, 18, or any other speeds from which the rotational speeds of the wheels 16, 18 could be inferred.

In some embodiments, the rotational speeds representative of the rotational speeds of the front wheels 16 may take into account a steering angle at which the front wheels 16 are set. Notably, since the front wheels 16 are steerable, the speeds of the front wheels 16 could be different from one another if the steering angle at which the front wheels 16 are set deviates from the neutral position (i.e., with the front wheels 16 oriented straight such that the ATV 10 is in a straight path). Therefore, the ECU 200 may use the steering angle sensed by the steering angle sensor 250 (FIG. 6) to determine the rotational speeds representative of the rotational speeds of the front wheels 16. For instance, in one example, when the steering angle sensed by the steering angle sensor 250 is greater than a given value (e.g., 0°, 2°, 5°, etc.), the ECU 200 may take the average of the rotational speeds of the front left wheel 16 and the front right wheel 16 as being the rotational speed representative of the rotational speeds of the front wheels 16. In other cases, the ECU 200 may set a corrective steering factor based on the steering angle and apply the corrective steering factor to the actual rotational speeds of the front wheels 16 in order to determine the rotational speeds representative of the rotational speeds of the front wheels 16.

Next, at 516, the determined rotational speeds representative of the rotational speeds of the front and rear wheels 16, 18 are compared to one another. If the rear wheels 18 are slipping, the rotational speed thereof will be less than that of the front wheels 16 as the rear wheels 18 will be decelerating faster than the front wheels 16. Therefore, in this embodiment, at 518, the rear wheels 18 are determined to be slipping if a difference between the rotational speeds representative of the rotational speeds of the front and rear wheels 16, 18 is greater than a predetermined threshold wheel speed difference. In this embodiment, the predetermined threshold wheel speed difference is approximately 30 rpm (equivalent to approximately 4 km/h). The predetermined threshold wheel speed difference could vary in other embodiments. For example, the predetermined threshold wheel speed difference may be between 15 rpm and 75 rpm inclusively. Alternatively, the rear wheels 18 could be determined to be slipping if the difference between the rotational speeds representative of the rotational speeds of the front and rear wheels 16, 18 is greater than a rotational speed representative of a percentage of the speed of the ATV 10 measured on the basis of the rotational speed of the front wheels 16 (e.g., 2%, 5%, 10%, etc.).

If the rear wheels 18 are determined to be slipping at 518, the method proceeds to optional step 526 (or step 530 in embodiments in which the optional step 526 is omitted) as will be described in greater detail below. Otherwise, the method restarts at 505.

It will be understood that, in an alternative scenario where the front wheels 16 are driven by the engine 20 rather than the rear wheels 18 (i.e., a front wheel drive), the rear wheels 18 would be presumed to not be slipping. Thus, in such a scenario, the rotational speeds representative of the rotational speeds of the front wheels 16 would be expected to be less than the rotational speeds representative of the rotational speeds of the rear wheels 18 if the front wheels 16 were slipping. The same process would therefore be applied to determine if the front wheels 16 were slipping as that detailed above with respect to the rear wheels 18. Similarly, if the rear wheels 18 were steerable, the steering angle sensed by the steering angle sensor 250 could be used to determine the rotational speeds representative of the rotational speeds of the rear wheels 18.

When the ATV 10 is in the four-wheel drive mode such that the front wheels 16 and the rear wheels 18 are driven by the engine 20, engine braking affects the front wheels 16 and the rear wheels 18 and therefore the front wheels 16 and/or the rear wheels 18 could be slipping. Consequently, unlike in the two-wheel drive mode, neither the speed of the front wheels 16 nor the speed of the rear wheels 18 can be used as a reliable reference to determine if the wheels 16, 18 are slipping. Instead, as will be explained below, amongst other parameters, the deceleration of the ATV 10 is used to determine if the front wheels 16 and/or the rear wheels 18 are slipping.

Thus, if, at 512, it is determined that the ATV 10 is in the four-wheel drive mode, the method 500 proceeds to 520 where a speed parameter and a sensed deceleration of the ATV 10 are determined.

In this embodiment, the speed parameter of the ATV 10 is a sensed speed of the ATV 10. Since the wheels 16, 18 could be slipping, the sensed speed of the ATV 10, which is calculated based on the speed of the wheels 16, 18, may not be entirely accurate and thus is considered an approximation and may be referred to as an "estimated" speed. The sensed speed of the ATV 10 is determined by sensing the rotational speeds representative of the rotational speeds of the front wheels 16 and/or the rear wheels 18 and calculating the sensed speed of the ATV 10 based on the rotational speeds representative of the rotational speeds of the front wheels 16 and/or the rear wheels 18, and the diameters of the wheels 16, 18.

Alternatively, the speed parameter of the ATV 10 determined at 512 could be any one of the rotational speeds representative of the rotational speeds of the front and rear wheels 16, 18.

The sensed deceleration of the ATV 10 is an "estimated" deceleration of the ATV 10 since, similarly to the sensed speed of the ATV 10 discussed above, the sensed deceleration of the ATV 10 is calculated based on the speed of the wheels 16, 18 which may or may not be slipping. In this embodiment, the sensed deceleration of the ATV 10 is determined by sensing, via the wheel speed sensors 210, the rotational speeds representative of the rotational speeds of the front and rear wheels 16, 18, and then calculating the sensed deceleration of the ATV 10 based on a reduction of one or more of the rotational speeds representative of the rotational speeds of the front and rear wheels 16, 18.

Next, at 522, the sensed deceleration of the ATV 10 determined at 520 is compared to a threshold deceleration associated with the speed parameter of the ATV 10 (in this embodiment, the speed of the ATV 10) determined at 520. More specifically, in this embodiment, the ECU 200 refers to a look-up table 300 which, for example, could be stored in the memory module 204, in order to choose a predetermined threshold deceleration to which the sensed deceleration of the ATV 10 is to be compared. An example of the look-up table 300 is illustrated at FIG. 11. As shown in FIG. 11, the table 300 associates different values of the speed of the ATV 10 with values of the predetermined threshold deceleration of the ATV 10. In the table 300, each value of the predetermined threshold deceleration is the maximum deceleration of the ATV 10 associated with a throttle request of the ATV 10 (at the throttle operator 91) being reduced to null at the associated value of the speed parameter of the ATV 10 while the ATV 10 travels on a flat (i.e., no or minimal inclination) non-slip surface. In other words, the predetermined threshold deceleration of the ATV 10 at a sensed speed $S_x$ (e.g., 50 km/h) is the maximum deceleration of the ATV 10 when the driver of the ATV 10 drops the throttle request to null (e.g., lets go of the throttle operator 91) while the ATV 10 is rolling at the speed $S_x$ on a flat non-slip surface with the CVT 102 in a gear ratio determined by the effective diameters of the pulleys 111, 113 corresponding to the speed of the engine 20 and torque applied to the pulleys 111, 113. A non-slip surface is hereby characterized as a dry surface having a sufficiently high friction coefficient to prevent wheel slip at any speed for the above-described test. In this example, the non-slip surface is dry asphalt.

Alternatively, the predetermined threshold deceleration values of the table 300 can be established by, on a flat non-slip surface, bringing the ATV 10 to its maximum speed, letting go of the throttle operator 91 (dropping the throttle valve 75 to a closed or near closed position) and recording the decelerations at the various vehicle speeds as the vehicle speed decreases. These recorded deceleration values can be used as the predetermined threshold deceleration for the vehicle speed values at which they were recorded. Other ways of determining the threshold deceleration data are contemplated.

In embodiments in which the speed parameter of the ATV 10 determined at 520 is one of the rotational speeds representative of the rotational speeds of the front and rear wheels 16, 18, then the look-up table 300 would associate the values of that rotational speed with the values of the predetermined threshold deceleration of the ATV 10.

In some embodiments, at 522, rather than using the predetermined threshold deceleration as the threshold for the comparison to the sensed deceleration of the ATV 10, the method 500 uses an actual deceleration of the ATV 10 as the threshold deceleration. In other words, the sensed deceleration of the ATV 10 is compared to an actual deceleration of the ATV 10 measured by the acceleration sensor 260 (FIG. 6). Such acceleration sensors are known and will thus not be further described here. While the sensed deceleration of the ATV 10 is an estimate since it relies on wheel speed measurements which may be inaccurate due to potential slipping of the wheels, the actual deceleration of the ATV 10 is an accurate representation of the deceleration of the ATV 10. Thus, by comparing the sensed deceleration of the ATV 10 to the actual deceleration of the ATV 10 as measured by the acceleration sensor 260, it can be determined if the sensed deceleration of the ATV 10 is indicative of wheel slip since the sensed deceleration of the ATV 10 should not be greater than the actual deceleration of the ATV 10.

At 524, based on the comparison performed at 522, it is determined if the front wheels 16 and/or the rear wheels 18 are slipping. More specifically, in this embodiment, the front wheels 16 and/or the rear wheels 18 are determined to be slipping if the sensed deceleration of the ATV 10 is greater than the predetermined threshold deceleration associated with the determined speed of the ATV 10 (selected from the table 300).

Alternatively, in embodiments in which the actual deceleration of the ATV 10, as measured by the acceleration sensor 260, is used as the threshold deceleration, the front wheels 16 and/or the rear wheels 18 are determined to be slipping if the sensed deceleration of the ATV 10 is greater than the actual deceleration of the ATV 10.

In other embodiments, the sensed deceleration of the ATV 10 could first be compared to the actual deceleration of the ATV 10 measured by the acceleration sensor 260 to determine if the wheels 16, 18 are slipping, and then, as an additional confirmation step, compare the sensed deceleration of the ATV 10 to the predetermined threshold deceleration based on the determined speed parameter of the ATV 10.

Thus, if the front wheels 16 and/or rear wheels 18 are determined to be slipping at 524, the method proceeds to optional step 526 (or step 530 in embodiments in which the optional step 526 is omitted) as will be described in greater detail below. Otherwise, the method restarts at 505.

In some embodiments, the steps 520, 522, 524 can be performed in parallel or in series with the steps 514, 516, 518 associated with the two-wheel drive mode while the vehicle 10 is operating in the two-wheel drive mode. In other embodiments, when the vehicle 10 is operating in the two wheel drive mode, the steps 514, 516, 518 are performed if the brake calipers 84, 108 are not actuated, whereas the steps 520, 522, 524 are performed if the brake calipers 84, 108 are actuated (or actuated below a certain level, see step 528 below).

In some embodiments, the step 512 for determining if the ATV 10 is in the two-wheel drive mode or four-wheel drive mode can be omitted (as illustrated by the dashed line contour of 512 in FIG. 8). In such an embodiment, the steps 514, 516, 518 are performed in parallel with the steps 520, 522, 524 irrespective of the drive mode set by the drive mode switch 132, and if at any of steps 518, 524 it is determined that the front wheels 16 and/or rear wheels 18 are slipping, the method 500 proceeds to step 526 (or step 530 in embodiments in which step 526 is omitted).

In other embodiments, following step 512, the steps 514, 516, 518 are performed in parallel or in series with the steps 520, 522, 524 irrespective of the drive mode set by the drive mode switch 132 before proceeding to step 526 (or step 530 in embodiments where step 526 is omitted). In such embodiments, the determination of the drive mode (i.e. two-wheel drive or four-wheel drive) made at step 512 is used to give a weight to the amount of slipping determined by steps 514, 516, 518 and to the amount of slipping determined by steps 520, 522, 524 when performing step 530. If at step 512 it is determined that the vehicle 10 is operating in two-wheel drive mode, then more weight is given to the amount of slipping determined by steps 514, 516, 518 than to the amount of slipping determined by steps 520, 522, 524. If at step 512 it is determined that the vehicle 10 is operating in four-wheel drive mode, then more weight is given to the amount of slipping determined by steps 520, 522, 524 than to the amount of slipping determined by steps 514, 516, 518.

Returning to the method 500 of the present embodiment, the method 500 considers actuation of the brake calipers of the ATV 10 (i.e., actuation of the left and right front calipers 84, and the single caliper 108) at steps 526, 528. More specifically, in this embodiment, after having determined if the front and/or rear wheels 16, 18 are slipping at 510, a brake operation parameter of the ATV 10 is determined at 526. The brake operation parameter is indicative of the actuation of at least one of the calipers 84, 108 by the driver's input at the hand lever 90 and/or foot lever 110. In this embodiment, the brake operation parameter is a pressure measured within a brake fluid circuit, including the hoses 95L, 95R, 116, 126 and the front and rear master cylinders 92, 112, of the ATV 10. In this example, determining the brake operation parameter of the ATV 10 includes sensing the pressure within at least one of the master cylinders 92, 112 via one or more of the brake sensors 240, which can be implemented as piezoelectric sensors for example. Notably, each one of the brake sensors 240 is mounted to a corresponding one of the master cylinders 92, 112 to sense the pressure therein.

Next, at 528, the brake operation parameter is compared to a predetermined threshold brake operation parameter. More particularly, in this embodiment, the pressure determined at 526 (i.e., the pressure measured within one or both of the master cylinders 92, 112) is compared to a predetermined threshold pressure associated with a certain actuation level of the calipers 84, 108. For instance, in this example, the predetermined threshold pressure is approximately 5 psi. The predetermined threshold pressure may have any other suitable value in other embodiments. For example, the predetermined threshold pressure may be between 2 psi and 15 psi inclusively.

If the brake operation parameter is less than the predetermined threshold brake operation parameter, the method 500 proceeds to 530. However, if the brake operation parameter is greater than the predetermined threshold brake operation parameter, the method restarts at 505.

The steps 526, 528 are optional and thus may be omitted in some embodiments.

At 530, whether in the two-wheel drive mode or the four-wheel drive mode, the torque output of the engine 30 is increased in order to reduce the engine braking that is causing wheel slip. In other words, if the front wheels 16 and/or the rear wheels 18 are determined to be slipping, the DTC feature implemented by the ECU 200 activates to cause the torque output of the engine 20 to increase and thereby reduce wheel slip. Notably, during engine braking, the torque output of the engine 30 has as a "current" engine torque output value $\tau_c$ that is negative (e.g., −100 N-m). This negative torque results in that the driven wheels of the ATV 10 are slipping. Therefore, by increasing the torque output of the engine 30, the method 500 aims to reduce the wheel slip.

The increase in torque output of the engine 20 varies in accordance with the drive mode (two-wheel or four-wheel drive mode) selected by the drive mode switch 132.

More specifically, when the ATV 10 is in the two-wheel drive mode, the torque output of the engine 30 is increased from the current engine torque output value $\tau_c$ to an engine torque output value $\tau_{i2}$ (shown in FIG. 9C which will be described in more detail below). The engine torque output value $\tau_{i2}$ corresponds to the torque output necessary for the rear wheels 18 to adopt the same rotational speed as the front wheels 16. In other words, the engine torque output value $\tau_{i2}$ will cause the rear wheels 18 to accelerate and match the speed of the front wheels 16. As such, the engine torque output value $\tau_{i2}$ is greater than zero. By ensuring that the driven rear wheels 18 have the same or close to the same rotational speed as the front wheels 16, the wheel slip experienced by the rear wheels 18 is eliminated or reduced since the significant deceleration rate of the rear wheels 18 is stopped and the rear wheels 18 instead continue their deceleration at a rate similar to that of the front wheels 16.

Conversely, when the ATV 10 is in the four-wheel drive mode, the torque output of the engine 30 is increased from the current engine torque output value $\tau_c$ to an engine torque output value $\tau_{i4}$ (shown in FIG. 10C which will be described in more detail below) that is less than the engine torque output value $\tau_{i2}$ of the two-wheel drive mode.

Notably, because, in this embodiment, the determined speed parameter of the ATV 10 (or other speed parameter) on the basis of which the predetermined threshold deceleration was determined is a rough estimate (since it is based on the rotational speeds of the wheels 16, 18, which may or may not be slipping), the implementation of DTC is more conservative when the ATV 10 is in the four-wheel drive mode since the method 500 generally avoids accelerating the slipping wheels to a point where they would make the ATV 10 go faster than it was before DTC activation. For this reason, in this embodiment, the increased engine torque output value $\tau_{i4}$ is near zero or equal to zero. As such, the torque output increase that results in the increased engine torque output value $\tau_{i4}$ (i.e., the difference between the engine torque output value $\tau_{i4}$ and the current engine torque output value $\tau_c$) is approximately equal and opposite to the current engine torque output value $\tau_c$. For example, if the current engine torque output value $\tau_c$ is −100 N-m, then the torque output increase that results in the increased engine torque output value $\tau_{i4}$ is approximately +100 N-m.

More specifically, the torque output of the engine 20 is increased from a negative engine torque output value to a zero or near zero engine torque output value. In order to increase the torque output of the engine 20, the ECU 200 controls the throttle valve actuator 81 to move the throttle valve 75 from a current position to an increased opening position such as to increase the air supply to the engine 20. This also reduces the engine braking being experienced as the vacuum in the air intake manifold of the ATV 10 is reduced due to the opening of the throttle valve 75.

As is known, the torque output of the engine can be calculated by the ECU 200 based on the rotational speed output of the engine 20, fuel injection into the cylinders thereof and the ignition timing of the engine 20. Alternatively, the torque output of the engine 20 may be measured by the optional engine torque sensor 220.

Next, at 540, the increased engine torque output value ($\tau_{i2}$ or $\tau_{i4}$) of the engine 20 is maintained until a condition specific to the drive mode selected by the drive mode switch 132 is met.

More specifically, when the ATV 10 is in the two-wheel drive mode, the increased engine torque output value $\tau_{i2}$ is maintained until a difference between the rotational speeds representative of the front wheels 16 and the rear wheels 18 is less than the rotational wheel speed equivalent to the predetermined threshold wheel speed difference which, as discussed above, is approximately 30 rpm in this embodiment. The predetermined threshold wheel speed difference could vary in other embodiments. For example, the predetermined threshold wheel speed difference may be the rotational speed equivalent of between 15 rpm and 75 rpm inclusively.

When the ATV 10 is in the four-wheel drive mode, the increased engine torque output value $\tau_{i4}$ is maintained until the sensed deceleration of the ATV 10 is less than the predetermined threshold deceleration associated with the determined speed of the ATV 10. Alternatively, as mentioned above, the actual deceleration of the ATV 10 could be used as the threshold deceleration such that the increased engine torque output value $\tau_{i4}$ is maintained until the sensed deceleration of the ATV 10 is less than the actual deceleration of the ATV 10 as measured by the acceleration sensor 260.

After 540, the method 500 restarts again at 505.

The method 500 as described can reduce wheel slip caused by engine braking. This will be shown in greater detail with reference to the graphs of FIGS. 9A to 9D and 10A to 10D which illustrate certain operation parameters of the ATV 10 when undergoing wheel slip in the two-wheel drive mode (FIGS. 9A to 9D) and the four-wheel drive mode (FIGS. 10A to 10D).

With reference to FIGS. 9A to 9D, the graphs illustrated therein shows the speeds of the wheels 16, 18 (FIG. 9D) during wheel slip of the rear wheels 18 caused by engine braking when the ATV 10 is in the two-wheel drive mode. For better comprehension of the sequence of events that lead to the reduction of wheel slip, the graphs also show a function representative of the activation of the DTC (FIG. 9A), the position of the throttle operator 91 and the position of the throttle valve 75 (FIG. 9B), as well as a torque request corresponding to the DTC and the engine torque (FIG. 9C).

As shown in FIGS. 9A to 9D, at time $t_a$, the input at the throttle operator 91 drops to null (i.e., the driver has let go of the throttle lever) and a corresponding drop in engine torque output is observed. At time $t_b$, the DTC is activated as the rear wheels 18 are determined to be slipping since the difference between the speed of the rear wheels 18 and the speed of the front wheels 16 increases past the predetermined threshold wheel speed difference. The DTC torque request (i.e., the torque requested by the DTC function) thus increases from zero (and the throttle valve 75 opens up in response—in the graph of FIG. 9B, the position 1 corresponds to the throttle valve 75 being in an open position such as a maximum open position for example). After a short reaction time, the engine torque increases in response to the DTC torque request. At time $t_c$, the difference between the speed of the rear wheels 18 and the speed of the front wheels 16 drops below the predetermined threshold wheel speed difference (the DTC torque request overshot what was necessary to bring the difference between the speed of the rear wheels 18 and the speed of the front wheels 16 below the predetermined threshold wheel speed difference) and thus the DTC is deactivated which drops the DTC torque request to null. However, since in the present example the rear wheels 18 continued slipping, shortly thereafter, at time $t_d$, the DTC is reactivated as the speed of the rear wheels 18 drops again at a greater rate than the front wheels 16 such that the difference between the speed of the rear wheels 18 and the speed of the front wheels 16 increases past the predetermined threshold wheel speed difference again. The DTC torque request increases again, although it is lower this time as the ECU 200 reduces the torque request overshoot from the first DTC activation and aims for a torque request sufficient to bring the difference between the speed of the rear wheels 18 and the speed of the front wheels 16 to the predetermined threshold wheel speed difference. Shortly after time $t_d$, the speed of the rear wheels 18 increases such that the difference between the speed of the rear wheels 18 and the speed of the front wheels 16 is equal to or slightly less than the predetermined threshold wheel speed difference. The DTC remains activated to at least maintain (i.e., not allow an increase of) this wheel speed difference between the front and rear wheels 16, 18 until the difference between the speed of the rear wheels 18 and the speed of the front wheels 16 drops below the predetermined threshold at time $t_e$, leading to the deactivation of the DTC.

Figure 10A:
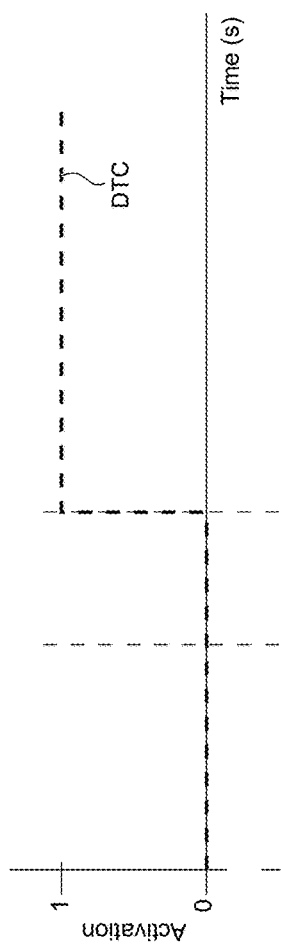
FIGS. 10A to 10D are graphs showing operation parameters of the vehicle of FIG. 1 when undergoing wheel slip in a four-wheel drive mode.
Figure 10B:
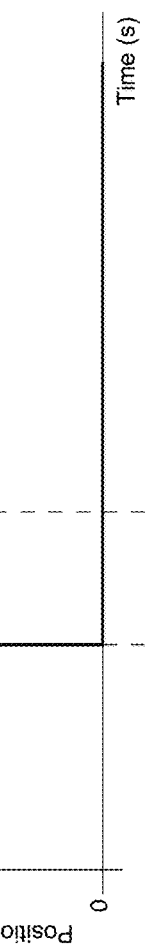
Figure 10C:
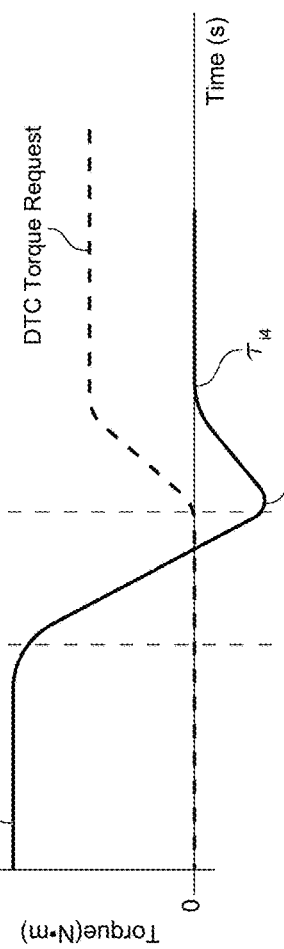
Figure 10D:
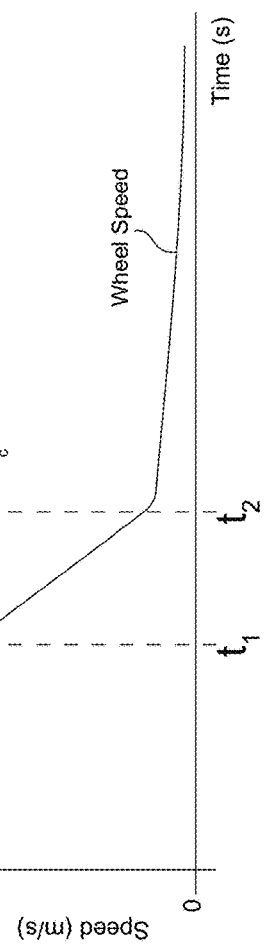

With reference to FIGS. 10A to 10D, the graphs illustrated therein show the speed of any one of the wheels 16, 18 (FIG. 10D) during wheel slip thereof caused by engine braking when the ATV 10 is in the four-wheel drive mode. For better comprehension of the sequence of events that lead to the reduction of wheel slip, the graphs also show a function representative of the activation of the DTC (FIG. 10A), a function representative of the input provided by the throttle operator 91 (FIG. 10B), as well as a torque request corresponding to the DTC and the engine torque output (FIG. 10C).

As shown in FIG. 10B, at time $t_1$, the input at the throttle operator 91 drops to null (i.e., the driver has let go of the throttle lever) and a corresponding drop in engine torque output is observed in FIG. 10C. The observed wheel speed of at least one of the wheels 16, 18 thus begins decelerating. At time $t_2$, the wheel is determined to be slipping as the sensed deceleration of ATV 10 is greater than the associated predetermined threshold deceleration (chosen from table 300 based on the sensed speed of the ATV 10 or wheel as described above). As shown in FIG. 10C, the engine torque output is negative at this point due to engine braking as discussed above. Since the wheel is determined to be slipping, the DTC activates (FIG. 10A) and the DTC torque request increases from zero to a value sufficient to make the engine torque output equal to or near to zero (FIG. 10C) in order to avoid accelerating the slipping wheel. Thus, shortly after, the DTC torque request stabilizes to maintain the engine torque output to zero and the wheel decelerates at a lesser rate (FIG. 10D), thus reducing wheel slip.

While the graphs of FIGS. 10A to 10D are explained by using the predetermined threshold deceleration as the threshold deceleration for comparing the sensed deceleration of the ATV 10 thereto, in alternative embodiments, as described above, the actual deceleration of the ATV 10 as measured by the acceleration sensor 260 could be used as the threshold deceleration to which the sensed deceleration of the ATV 10 is compared.

In some embodiments, the method 500 could be performed depending on the position of the throttle valve 75. For example, in such embodiments, the method 500 could only start if the position of the throttle valve 75 is zero (i.e., closed) or near zero. In other words, if the position of the throttle valve 75 is greater than a predetermined threshold throttle valve position, the method 500 does not start. Such a step could ascertain that the ATV 10 is indeed undergoing engine braking as the drop in throttle valve position is indicative of the throttle operator 91 having been let go by the driver.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A method of managing wheel slip in a vehicle, the vehicle comprising:
    a frame;
    an internal combustion engine connected to the frame;
    front and rear wheels operatively connected to the engine;
    a throttle valve for controlling a supply of air to the engine;
    a steering assembly operatively connected to at least the front wheels for steering the vehicle; and
    an unassisted continuously variable transmission (CVT) operatively connecting the front wheels and the rear wheels to the engine;
    the method comprising:
        determining a sensed deceleration of the vehicle resulting from a drop in a position of the throttle valve reducing the supply of air to the engine;
        comparing the sensed deceleration of the vehicle to a threshold deceleration; and
        increasing a torque output of the engine from a current engine torque output value to an increased engine torque output value when the sensed deceleration of the vehicle is greater than the threshold deceleration.

2. The method of claim 1, wherein increasing the torque output of the engine from the current engine torque output value to the increased engine torque output value comprises increasing the torque output of the engine from a negative engine torque output value to a zero or near zero engine torque output value.

3. The method of claim 1, further comprising:
    maintaining the torque output of the engine approximately close to the increased engine torque output value until the sensed deceleration of the vehicle is less than the threshold deceleration of the vehicle.

4. The method of claim 1, wherein increasing the torque output of the engine comprises:
    moving the throttle valve from a current position to an increased opening position.

5. The method of claim 1, further comprising determining a speed parameter of the vehicle, the speed parameter of the vehicle being one of:
    a sensed speed of the vehicle; and
    a rotational speed representative of a rotational speed of at least one of the front and rear wheels,
    wherein the threshold deceleration is a predetermined threshold deceleration associated with the speed parameter of the vehicle.

6. The method of claim 5, wherein:
    the speed parameter of the vehicle is the sensed speed of the vehicle; and
    determining the speed parameter of the vehicle comprises:
        sensing a rotational speed representative of the rotational speed of at least one of the front and rear wheels; and
        calculating the sensed speed of the vehicle based at least in part on the rotational speed representative of the rotational speed of the at least one of the front and rear wheels.

7. The method of claim 6, wherein calculating the sensed speed of the vehicle is further based on a steering angle sensed by a steering angle sensor of the steering assembly.

8. The method of claim 5, wherein the predetermined threshold deceleration is a maximum deceleration of the vehicle associated with a throttle request of the vehicle being reduced to null at the determined speed parameter of the vehicle while the vehicle travels on a non-slip surface.

9. The method of claim 1, wherein the threshold deceleration is an actual deceleration of the vehicle sensed by an acceleration sensor of the vehicle.

10. The method of claim 1, wherein determining the sensed deceleration of the vehicle comprises:
    sensing a rotational speed representative of a rotational speed of at least one of the front and rear wheels; and
    calculating the sensed deceleration of vehicle based on a reduction of the rotational speed representative of the rotational speed of the at least one of the front and rear wheels.

11. The method of claim 1, further comprising determining a brake operation parameter of the vehicle indicative of actuation of brakes of the vehicle, wherein:
    the torque output of the engine is increased from the current engine torque output value to the increased engine torque output value when:
        the sensed deceleration of the vehicle is greater than the threshold deceleration; and
        the brake operation parameter of the vehicle is less than a predetermined threshold brake operation parameter.

12. The method of claim 11, wherein:
    the brake operation parameter is a pressure measured within a brake fluid circuit of the vehicle; and
    the predetermined threshold brake operation parameter is a predetermined threshold pressure.

13. A vehicle comprising:
    an electronic control unit (ECU) comprising:
        a non-transitory computer-readable medium; and
        a processor configured to perform the method of claim 1;
    the frame;
    a seat connected to the frame;
    the internal combustion engine connected to the frame;
    the throttle valve for controlling a supply of air to the engine;
    the front and rear wheels operatively connected to the engine;
    the unassisted CVT operatively connecting the front and rear wheels to the engine, the CVT comprising:
        a drive pulley operatively connected to the engine;
        a driven pulley operatively connected to the front and rear wheels; and
        a drive belt wrapped around the drive pulley and the driven pulley;
    the steering assembly operatively connected to at least the front wheels for steering the vehicle; and
    a plurality of sensors for sensing parameters related to operation of the vehicle, the ECU communicating with the plurality of sensors.

14. A method of managing wheel slip in a vehicle, the vehicle comprising:
a frame;
an internal combustion engine connected to the frame;
front and rear wheels operatively connected to the engine;
a throttle valve for controlling a supply of air to the engine;
a steering assembly operatively connected to at least the front wheels for steering the vehicle;
an unassisted continuously variable transmission (CVT) operatively connecting at least the rear wheels to the engine; and
a drive mode switch for selectively setting the vehicle in one of:
  a two-wheel drive mode in which the front wheels or the rear wheels are driven by the engine; and
  a four-wheel drive mode in which the front wheels and the rear wheels are driven by the engine;
the method comprising:
  determining if at least one of the front wheels or the rear wheels is slipping as a result of a drop in a position of the throttle valve reducing the supply of air to the engine; and
  increasing a torque output of the engine when the at least one of the front wheels or the rear wheels is determined to be slipping, such that:
    when the vehicle is in the two-wheel drive mode, the torque output of the engine is increased from a current engine torque output value to a first engine torque output value; and
    when the vehicle is in the four-wheel drive mode, the torque output of the engine is increased from the current engine torque output value to a second engine torque output value, the second engine torque output value being less than the first engine torque output value.

15. The method of claim 14, wherein:
the first engine torque output value is greater than zero; and
the second engine torque output value is near zero or equal to zero.

16. The method of claim 14, further comprising:
after increasing the torque output of the engine, maintaining the first engine torque output value or the second engine torque output value such that:
  when the vehicle is in the two-wheel drive mode, the first engine torque output value is maintained until a difference between a rotational speed representative of a rotational speed of the front wheels and a rotational speed representative of a rotational speed of the rear wheels is less than approximately 30 rpm; and
  when the vehicle is in the four-wheel drive mode, the second engine torque output value is maintained until a sensed deceleration of the vehicle is less than a threshold deceleration of the vehicle.

17. The method of claim 14, wherein determining if the at least one of the front wheels or the rear wheels is slipping comprises:
when the vehicle is in the two-wheel drive mode:
  determining a rotational speed representative of a rotational speed of the front wheels;
  determining a rotational speed representative of a rotational speed of the rear wheels;
  comparing the rotational speeds representative of the rotational speeds of the front wheels and the rear wheels, wherein driven ones of the front wheels or the rear wheels are determined to be slipping if a difference between the rotational speeds representative of the rotational speeds of the front wheels and the rear wheels is greater than approximately 30 rpm; and
when the vehicle is in the four-wheel drive mode:
  determining a sensed deceleration of the vehicle;
  comparing the sensed deceleration of the vehicle to a threshold deceleration, wherein the front wheels and the rear wheels are determined to be slipping when the sensed deceleration of the vehicle is greater than the threshold deceleration.

18. The method of claim 17, further comprising determining a speed parameter of the vehicle, the speed parameter of the vehicle being one of:
a sensed speed of the vehicle; and
at least one of the rotational speeds representative of the rotational speeds of the front and rear wheels,
wherein the threshold deceleration is a predetermined threshold deceleration associated with the speed parameter of the vehicle.

19. The method of claim 18, wherein:
the speed parameter of the vehicle is the sensed speed of the vehicle; and
determining the speed parameter of the vehicle comprises:
  sensing at least one of the rotational speeds representative of the rotational speeds of the front and rear wheels; and
  calculating the sensed speed of the vehicle based at least in part on the at least one of the rotational speeds representative of the rotational speeds of the front and rear wheels.

20. The method of claim 19, wherein calculating the sensed speed of the vehicle is further based on a steering angle sensed by a steering angle sensor of the steering assembly.

21. The method of claim 17, wherein determining the sensed deceleration of the vehicle comprises:
sensing at least one of the rotational speeds representative of the rotational speeds of the front and rear wheels; and
calculating the sensed deceleration of the vehicle based on a reduction of the at least one of the rotational speeds representative of the rotational speeds of the front and rear wheels.

22. The method of claim 17, wherein the threshold deceleration is a predetermined maximum deceleration of the vehicle associated with a throttle request of the vehicle being reduced to null at the determined speed parameter of the vehicle while the vehicle travels on a non-slip surface.

23. The method of claim 14, wherein the threshold deceleration is an actual deceleration of the vehicle sensed by an acceleration sensor of the vehicle.

24. The method of claim 14, further comprising determining a brake operation parameter of the vehicle indicative of actuation of brakes of the vehicle, wherein:
the torque output of the engine is increased from the current engine torque output value to the first engine torque output value or the second torque output value when:
  the brake operation parameter of the vehicle is less than a predetermined threshold brake operation parameter.

25. The method of claim 24, wherein:
the brake operation parameter is a pressure measured within a brake fluid circuit of the vehicle; and
the predetermined threshold brake operation parameter is a predetermined threshold pressure.

26. A vehicle comprising:
an electronic control unit (ECU) comprising:
　a non-transitory computer-readable medium; and
　a processor configured to perform the method of claim 14;
the frame;
a seat connected to the frame;
the internal combustion engine connected to the frame;
the throttle valve for controlling a supply of air to the engine;
the front and rear wheels operatively connected to the engine;
the unassisted CVT operatively connecting at least the rear wheels to the engine, the CVT comprising:
　a drive pulley operatively connected to the engine;
　a driven pulley operatively connected to the front and rear wheels; and
　a drive belt wrapped around the drive pulley and the driven pulley;
the steering assembly operatively connected to at least the front wheels for steering the vehicle;
the drive mode switch for selectively setting the vehicle in one of:
　the two-wheel drive mode in which the front wheels or the rear wheels are driven by the engine; and
　the four-wheel drive mode in which the front wheels and the rear wheels are driven by the engine;
and
a plurality of sensors for sensing parameters related to operation of the vehicle, the ECU communicating with the plurality of sensors.

* * * * *